(12) United States Patent
Lin et al.

(10) Patent No.: US 9,640,119 B2
(45) Date of Patent: May 2, 2017

(54) DRIVING METHODS FOR COLOR DISPLAY DEVICES

(71) Applicant: E INK CALIFORNIA, LLC, Fremont, CA (US)

(72) Inventors: Craig Lin, Oakland, CA (US); Ming-Jen Chang, New Taipei (TW)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

(21) Appl. No.: 15/285,999

(22) Filed: Oct. 5, 2016

(65) Prior Publication Data

US 2017/0025072 A1      Jan. 26, 2017

Related U.S. Application Data

(63) Continuation-in-part of application No. 14/939,666, filed on Nov. 12, 2015.

(60) Provisional application No. 62/080,845, filed on Nov. 17, 2014.

(51) Int. Cl.
| | |
|---|---|
| G09G 3/34 | (2006.01) |
| G09G 3/20 | (2006.01) |
| G02F 1/137 | (2006.01) |
| G02F 1/167 | (2006.01) |

(52) U.S. Cl.
CPC ............ *G09G 3/344* (2013.01); *G02F 1/137* (2013.01); *G02F 1/167* (2013.01); *G09G 3/2003* (2013.01); *G09G 3/2074* (2013.01); *G02F 2001/1672* (2013.01); *G09G 2310/0254* (2013.01); *G09G 2310/06* (2013.01)

(58) Field of Classification Search
CPC ...... G09G 2310/068; G09G 2300/0473; G09G 2310/06; G09G 2300/0452
See application file for complete search history.

(56) References Cited

U.S. PATENT DOCUMENTS

| | | |
|---|---|---|
| 6,930,818 B1 | 8/2005 | Liang |
| 7,046,228 B2 | 5/2006 | Liang |
| 7,349,147 B2 | 3/2008 | Chopra |
| 7,848,009 B2 | 12/2010 | Machida |
| 8,035,611 B2 | 10/2011 | Sakamoto |
| 8,791,896 B2 | 7/2014 | Kwon |
| 9,013,516 B2 | 4/2015 | Sakamoto |
| 2003/0231162 A1* | 12/2003 | Kishi ............... G02F 1/167 345/107 |
| 2008/0266243 A1 | 10/2008 | Johnson |

(Continued)

FOREIGN PATENT DOCUMENTS

| | | |
|---|---|---|
| JP | 2009116041 | 5/2009 |
| JP | 2011158783 | 8/2011 |

(Continued)

OTHER PUBLICATIONS

PCT/US15/60178, PCT Notification of Transmittal of the International Search Report and the Written Opinion of the International Searching Authority, or the Declaration, mailed on Feb. 18, 2016 Feb. 18, 2016.

*Primary Examiner* — Shaheda Abdin
(74) *Attorney, Agent, or Firm* — Brian D. Bean

(57) ABSTRACT

The present invention provides driving methods for color displays using electrophoretic fluids comprises four types of particles to display four colors at each pixel. Methods are also provided for displaying mixtures of certain pairs of colors at each pixel.

34 Claims, 37 Drawing Sheets

(56) References Cited

U.S. PATENT DOCUMENTS

| | | |
|---|---|---|
| 2010/0194733 A1 | 8/2010 | Lin |
| 2011/0025681 A1* | 2/2011 | Komatsu ................. G02F 1/167 |
| | | 345/214 |
| 2012/0154899 A1* | 6/2012 | Ahn ....................... G09G 3/344 |
| | | 359/296 |
| 2012/0256893 A1* | 10/2012 | Sakamoto ............ G09G 3/2003 |
| | | 345/208 |
| 2015/0097877 A1 | 4/2015 | Lin |
| 2016/0140909 A1 | 5/2016 | Lin |
| 2016/0275874 A1 | 9/2016 | Lin |
| 2016/0293111 A1 | 10/2016 | Lin |

FOREIGN PATENT DOCUMENTS

| | | |
|---|---|---|
| KR | 1020070082680 | 8/2007 |
| TW | 200938928 | 9/2009 |

\* cited by examiner

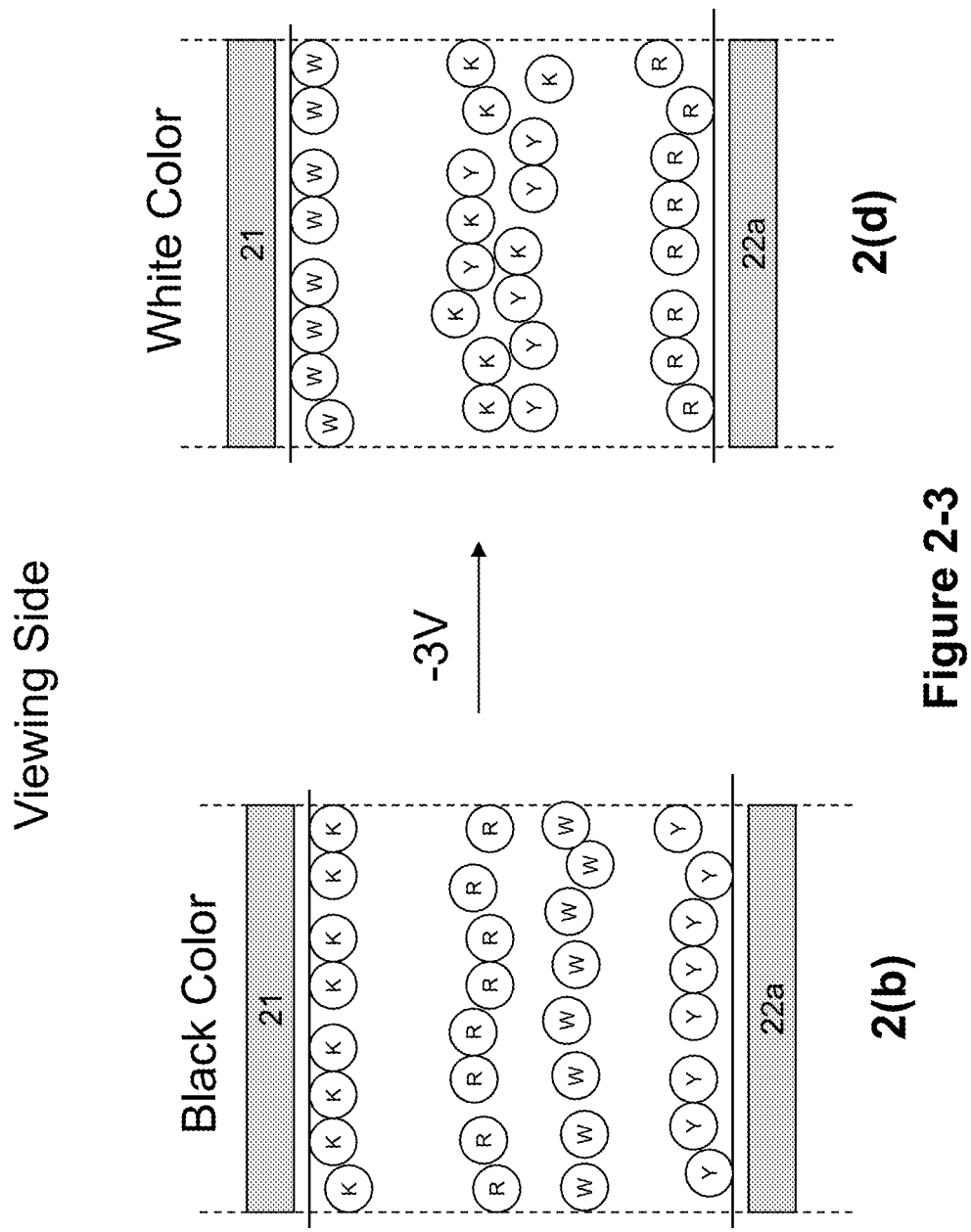

DRIVING METHODS FOR COLOR DISPLAY DEVICES

REFERENCE TO RELATED APPLICATIONS

This application is a continuation-in-part of copending application Ser. No. 14/939,666, filed Nov. 12, 2015 (Publication No. 2016/0140909), which itself claims benefit of provisional Application Ser. No. 62/080,845, filed Nov. 17, 2014.

The entire contents of the aforementioned applications, and of all issued U.S. patents and published and copending applications mentioned below, are herein incorporated by reference.

FIELD OF THE INVENTION

The present invention is directed to driving methods for a color display device in which each pixel can display at least four high-quality color states.

BACKGROUND OF THE INVENTION

In order to achieve a color display, color filters are often used. The most common approach is to add color filters on top of black/white sub-pixels of a pixelated display to display red, green and blue colors. When, a red color is desired, the green and blue sub-pixels are turned to the black state so that the only color displayed is red. When a blue color is desired, the green and red sub-pixels are turned to the black state so that the only color displayed is blue. When a green color is desired, the red and blue sub-pixels are turned to the black state so that the only color displayed is green. When the black state is desired, all three-sub-pixels are turned to the black state. When the white state is desired, the three sub-pixels are turned to red, green and blue, respectively, and as a result, a white state is seen by the viewer.

The biggest disadvantage of using such a technique is that since each of the sub-pixels has a reflectance of about one third of the desired white state, the white state is fairly dim. To compensate for this, a fourth sub-pixel may be added which can display only the black and white states, so that the white level is doubled at the expense of the red, green or blue color level (where each sub-pixel is only one fourth of the area of the pixel). Brighter colors can be achieved by adding light from the white pixel, but this is achieved at the expense of color gamut to cause the colors to be light and relatively unsaturated. A similar result can be achieved by reducing the color saturation of the three sub-pixels. Even with either of these approaches, the white level is normally substantially less than half of that of a black and white display, rendering it an unacceptable choice for display devices, such as E-readers or displays that need well readable black-white brightness and contrast.

In view of these disadvantages of color filter based displays, efforts have been made to develop color displays in which three or more colors can be displayed at each pixel. See, US 2015/0234250, U.S. Pat. No. 8,717,664, US 2015/0103394, US 2015/0097877, U.S. Pat. No. 9,170,468, US 2015/0198858, and US 2014/0340430. For convenience, such displays may hereinafter be referred to as "multi-color pixel" of "MCP" displays.

SUMMARY OF THE INVENTION

This invention is directed to a method for driving a display layer comprising a first, viewing surface and a second surface on the opposed side of the display layer from the viewing surface, the display layer being provided with means for applying an electric field between the first and second surfaces, the display layer further comprising an electrophoretic medium comprising a fluid and first, second, third and fourth types of particles dispersed in the fluid, the first, second, third and fourth types of particles having respectively first, second, third and fourth optical characteristics differing from one another, the first and third types of particles having charges of one polarity and the second and fourth types of particles having charges of the opposite polarity, the method comprising, in any order:

(i) applying a first electric field having a high magnitude and a polarity driving the first type of particles towards the viewing surface, thereby causing the display layer to display the first optical characteristic at the viewing surface;

(ii) applying a second electric field having a high magnitude and a polarity driving the second type of particles towards the viewing surface, thereby causing the display layer to display the second optical characteristic at the viewing surface;

(iii) when the second optical characteristic is displayed at the viewing surface, applying a third electric field having a low magnitude and a polarity driving the third type of particles towards the viewing surface, thereby causing the display layer to display the third optical characteristic at the viewing surface; and (iv) when the first optical characteristic is displayed at the viewing surface, applying a fourth electric field having a low magnitude and a polarity driving the fourth type of particles towards the viewing surface, thereby causing the display layer to display the fourth optical characteristic at viewing surface.

In this driving method of the present invention, the third electric field may be applied for a longer time than the first electric field and/or the fourth electric field may be applied for a longer period than the second electric field. Steps (i)-(iv) of the method may be repeated, for example at least four time and preferably at least eight times. The magnitudes of the third and fourth electric fields may be less than 50 percent of the magnitudes of the first and second electric fields respectively. The driving method of the present invention may further comprising applying a shaking waveform (a term explained in detail below) before at least one of steps (i)-(iv). When a shaking waveform is used, the method may further comprise driving the pixel to display the first or second optical characteristic after the shaking waveform but prior to step (i) or (ii). Whether or not a shaking waveform is used, the method of the present invention may further comprise applying no electric field for a period of time following at least one of steps (i)-(iv) and thereafter repeating steps (i)-(iv).

In the present method, at least one of steps (iii) and (iv) may further comprise applying no electric field for a period of time before applying the third or fourth electric field respectively. Step (iii) may be effected by first applying a high electric field having a polarity which drives the third particles towards the second surface and thereafter applying the third electric field. In such a method, a shaking waveform may be applied prior to application of the high electric field; also, the high electric field may be applied for a second period prior to the shaking waveform. The application of the high electric field and the application of the third electric field may be repeated at least twice, and preferably at least four times. No electric field may be applied to the electrophoretic medium for a period following the application of the third electric field and/or for a period between the application of the high electric field and the application of the third electric field.

In the present method, step (iv) may be effected by first applying a high electric field having a polarity which drives the fourth particles towards the second surface and thereafter applying the fourth electric field. In such a method, a shaking waveform may be applied prior to application of the high electric field; also, the high electric field may be applied for a second period prior to the shaking waveform. The application of the high electric field and the application of the third electric field may be repeated at least twice, and preferably at least four times. No electric field may be applied to the electrophoretic medium for a period following the application of the third electric field and/or for a period between the application of the high electric field and the application of the third electric field.

Embodiments of the method of the present invention allow the display of mixtures of the colors of the second and third particles, or of the colors of the first and fourth particles. One such embodiment further comprises:

(v) when the third optical characteristic is displayed at the viewing surface, applying a fifth electric field having a high magnitude and a polarity driving the third type of particles towards the second surface, thereby causing the display layer to display a mixture of the second and third optical characteristics at the viewing surface.

In this embodiment, the fifth electric field may be applied for a period shorter than the third electric field, for example for a period no longer than 50 percent of the period for which the third electric field is applied. The third optical characteristic may be displayed at the viewing surface by applying the third electrical field to the electrophoretic layer, and the application of the third electric field followed by the fifth electric field may be repeated at least twice. The third optical characteristic may be displayed at the viewing surface by first applying a high electric field having a polarity which drives the third particles towards the second surface and thereafter applying the third electric field.

Another embodiment of the invention to show a mixture of particle colors may further comprise:

(vi) when the fourth optical characteristic is displayed at the viewing surface, applying a sixth electric field having a high magnitude and a polarity driving the fourth type of particles towards the second surface, thereby causing the display layer to display a mixture of the first and fourth optical characteristics at the viewing surface.

In this embodiment, the sixth electric field may applied for a period shorter than the fourth electric field, for example for a period no longer than 50 percent of the period for which the fourth electric field is applied. The fourth optical characteristic may be displayed at the viewing surface by applying the fourth electrical field to the electrophoretic layer, and the application of the fourth electric field followed by the sixth electric field may be repeated at least twice. The fourth optical characteristic may be displayed at the viewing surface by first applying a high electric field having a polarity which drives the fourth particles towards the second surface and thereafter applying the fourth electric field.

BRIEF DESCRIPTION OF THE DRAWINGS

FIGS. 2-1 to 2-3 are schematic cross-sections similar to those of FIG. 1 but illustrating changes in particle positions effected during various steps of driving methods of the present invention.

FIG. 3 shows a shaking waveform which may be used in the driving methods of the present invention.

DETAILED DESCRIPTION OF THE INVENTION

As already mentioned, the present invention relates to a driving method for a display layer comprising an electrophoretic medium containing first, second, third and fourth types of particles all dispersed in a fluid and all having differing optical characteristics. These optical characteristics are typically colors perceptible to the human eye, but may be other optical properties, such as optical transmission, reflectance, luminescence or, in the case of displays intended for machine reading, pseudo-color in the sense of a change in reflectance of electromagnetic wavelengths outside the visible range. The invention broadly encompasses particles of any colors as long as the multiple types of particles are visually distinguishable.

The four types of particles present in the electrophoretic medium may be regarded as comprising two pairs of oppositely charged particles. The first pair (the first and second types of particles) consists of a first type of positive particles and a first type of negative particles; similarly, the second pair (third and fourth types of particles) consists of a second type of positive particles and a second type of negative particles. Of the two pairs of oppositely charged particles, one pair (the first and second particles) carries a stronger charge than the other pair (third and fourth particles). Therefore the four types of particles may also be referred to as high positive particles, high negative particles, low positive particles and low negative particles.

The term "charge potential", in the context of the present application, may be used interchangeably with "zeta potential" or with electrophoretic mobility. The charge polarities and levels of charge potential of the particles may be varied by the method described in U.S. Patent Application Publication No. 2014/0011913 and/or may be measured in terms of zeta potential. In one embodiment, the zeta potential is determined by Colloidal Dynamics AcoustoSizer IIM with a CSPU-100 signal processing unit, ESA EN# Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to be 5-10% by weight. The sample also contains a charge control agent (Solsperse 17000, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow through cell for determination of the zeta potential. Methods and apparatus for the measurement of electrophoretic mobility are well known to those skilled in the technology of electrophoretic displays.

Figure 1:
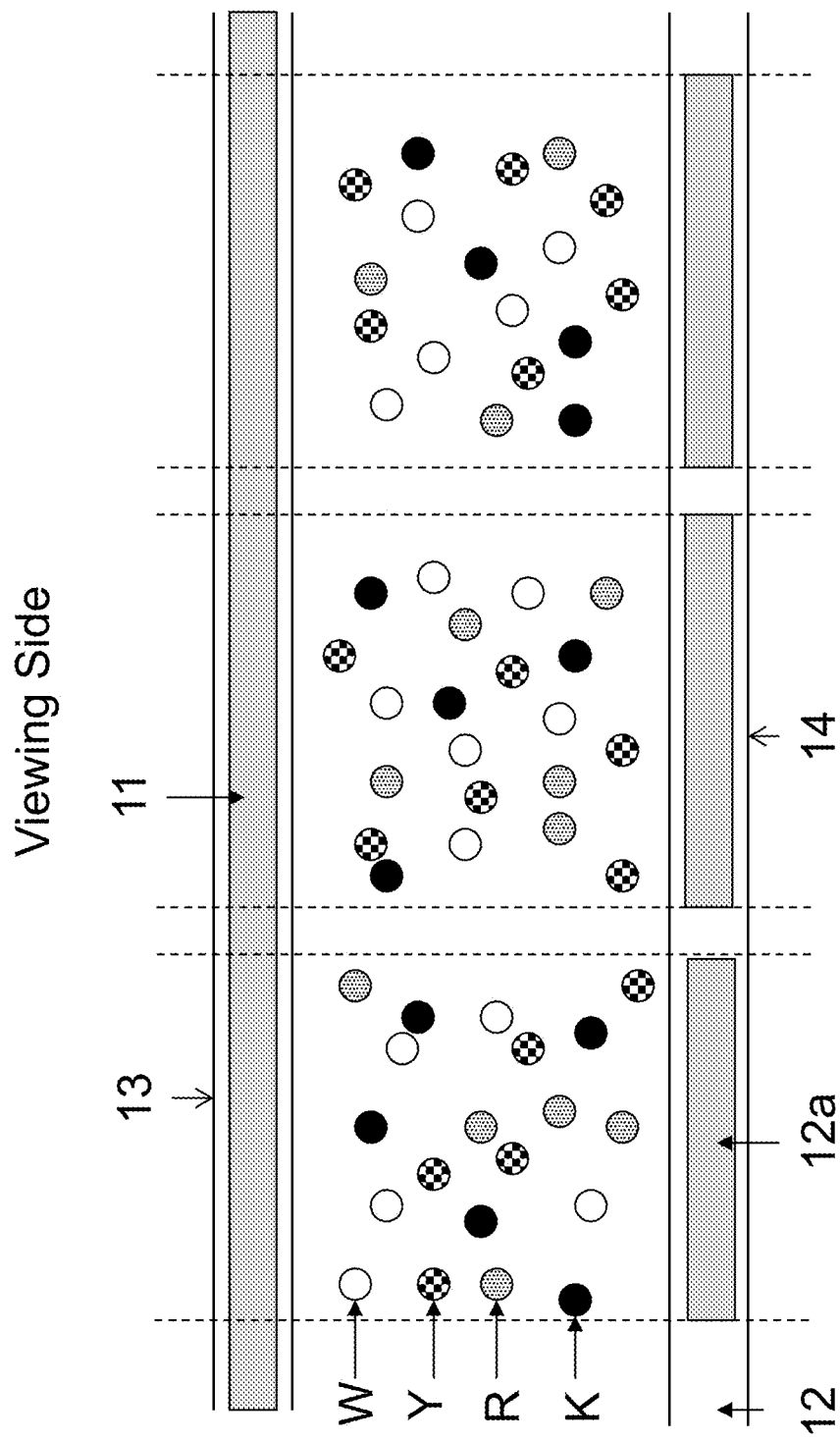
FIG. 1 is a schematic cross-section through a display layer containing four different types of particles and capable of displaying four different color states.

As an example shown in FIG. 1, first, black particles (K) and second, yellow particles (Y) are the first pair of oppositely charged particles, and in this pair, the black particles are the high positive particles and the yellow particles are the high negative particles. Third, red particles (R) and fourth, white particles (W) are the second pair of oppositely charged particles, and in this pair, the red particles are the low positive particles and the white particles are the low negative particles.

In another example not shown, the black particles may be the high positive particles; the yellow particles may be the low positive particles; the white particles may be the low negative particles and the red particles may be the high negative particles.

In addition, the color states of the four types of particles may be intentionally mixed. For example, yellow pigment by nature often has a greenish tint and if a better yellow color state is desired, yellow particles and red particles may be used where both types of particles carry the same charge polarity and the yellow particles are higher charged than the red particles. As a result, at the yellow state, there will be a small amount of the red particles mixed with the greenish yellow particles to cause the yellow state to have better color purity.

The particles are preferably opaque, in the sense that they should be light reflecting not light transmissive. It be apparent to those skilled in color science that if the particles were light transmissive, some of the color states appearing in the following description of specific embodiments of the invention would be severely distorted or not obtained. White particles are of course light scattering rather than reflective but care should be taken to ensure that not too much light passes through a layer of white particles. For example, if in the white state shown in FIG. 2-3 discussed below, the layer of white particles allowed a substantial amount of light to pass through it and be reflected from the particles behind it, the brightness of the white state could be substantially reduced. The particles used may be primary particles without a polymer shell. Alternatively, each particle may comprise an insoluble core with a polymer shell. The core could be either an organic or inorganic pigment, and it may be a single core particle or an aggregate of multiple core particles. The particles may also be hollow particles.

White particles may be formed from an inorganic pigment, such as $TiO_2$, $ZrO_2$, $ZnO$, $Al_2O_3$, $Sb_2O_3$, $BaSO_4$, $PbSO_4$ or the like. Black particles may be formed from CI pigment black 26 or 28 or the like (e.g., manganese ferrite black spinel or copper chromite black spinel) or carbon black. The other colored particles (which are non-white and non-black) may be red, green, blue, magenta, cyan, yellow or any other desired colored, and may be formed from, for example, CI pigment PR 254, PR122, PR149, PG36, PG58, PG7, PB28, PB15:3, PY83, PY138, PY150, PY155 or PY20. Those are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. The colored particles may also be inorganic pigments, such as red, green, blue and yellow. Examples may include, but are not limited to, CI pigment blue 28, CI pigment green 50 and CI pigment yellow 227.

The fluid in which the four types of particles are dispersed may be clear and colorless. It preferably has a low viscosity and a dielectric constant in the range of about 2 to about 30, preferably about 2 to about 15 for high particle mobility. Examples of suitable dielectric solvent include hydrocarbons such as isoparaffin, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotrifluoride, chloropentafluorobenzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Delaware, polydimethylsiloxane based silicone oil from Dow-corning (DC-200).

The percentages of different types of particles in the fluid may vary. For example, one type of particles may take up 0.1% to 10%, preferably 0.5% to 5%, by volume of the electrophoretic fluid; another type of particles may take up 1% to 50%, preferably 5% to 20%, by volume of the fluid; and each of the remaining types of particles may take up 2% to 20%, preferably 4% to 10%, by volume of the fluid.

The various types of particles may have different particle sizes. For example, the smaller particles may have a size which ranges from about 50 nm to about 800 nm. The larger particles may have a size which is about 2 to about 50 times, and more preferably about 2 to about 10 times, the sizes of the smaller particles.

Preferred embodiments of the invention will now be described in detail, though by way of illustration only, with reference to the accompanying drawings.

FIG. 1 is a schematic cross-section through a display layer which can be driven by methods of the present invention. The display layer has two major surfaces, a first, viewing surface 13 (the upper surface as illustrated in FIG. 1) through which a user views the display, and a second surface 14 on the opposed side of the display layer from the first surface 13. The display layer comprises an electrophoretic medium comprising a fluid and first, black particles (K) having a high positive charge, second, yellow particles (Y) having a high negative charge, third, red particles (R) have a low positive charge, and fourth, white particles (W) having a low negative charge. The display layer is provided with means for applying electric fields across the display layer, these field applying means having the form of two electrode layers, the first of which is a light-transmissive or transparent common electrode layer 11 extending across the entire viewing surface 13 of the display layer. This electrode layer 11 may be formed from indium tin oxide (ITO) or a similar light-transmissive conductor. The other electrode layer 12 is a layer of discrete pixel electrodes 12a on the second surface 14, these electrodes 12a defining individual pixel of the display, these pixels being indicated by dotted vertical lines in FIG. 1. An electric field is created for a pixel by the potential difference between a voltage applied to the common electrode and a voltage applied to the corresponding pixel electrode. The pixel electrodes 12a may form part of an active matrix driving system with, for example, a thin film transistor (TFT) backplane, but other types of electrode addressing may be used provided the electrodes provide the necessary electric field across the display layer.

The pixel electrodes may be described in U.S. Pat. No. 7,046,228. The pixel electrodes 12a may form part of an active matrix thin film transistor (TFT) backplane, but other types of electrode addressing may be used provided the electrodes provide the necessary electric field across the display layer.

In one embodiment, the charge carried by the "low charge" particles may be less than about 50%, preferably about 5% to about 30%, of the charge carried by the "high charge" particles. In another embodiment, the "low charge" particles may be less than about 75%, or about 15% to about 55%, of the charge carried by the "high charge" particles. In a further embodiment, the comparison of the charge levels as indicated applies to two types of particles having the same charge polarity. The charges on the "high positive" particles and the "high negative" particles may be the same or different. Likewise, the amplitudes of the "low positive" particles and the "low negative" particles may be the same or different. In any specific electrophoretic fluid, the two pairs of high-low charge particles may have different levels of charge differentials. For example, in one pair, the low positive charged particles may have a charge intensity which is 30% of the charge intensity of the high positive charged particles and in another pair, the low negative charged particles may have a charge intensity which is 50% of the charge intensity of the high negative charged particles.

Figures 1, 2:
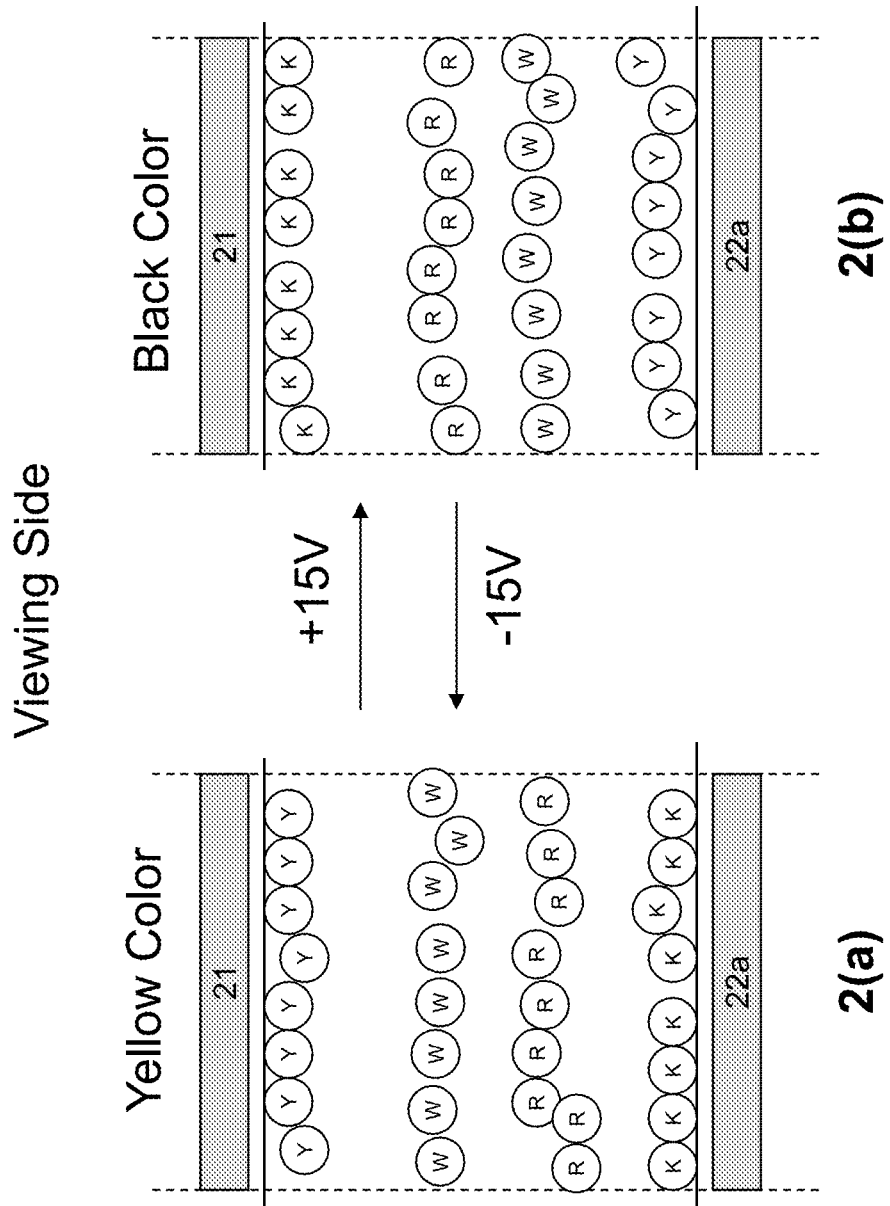
Figure 2:
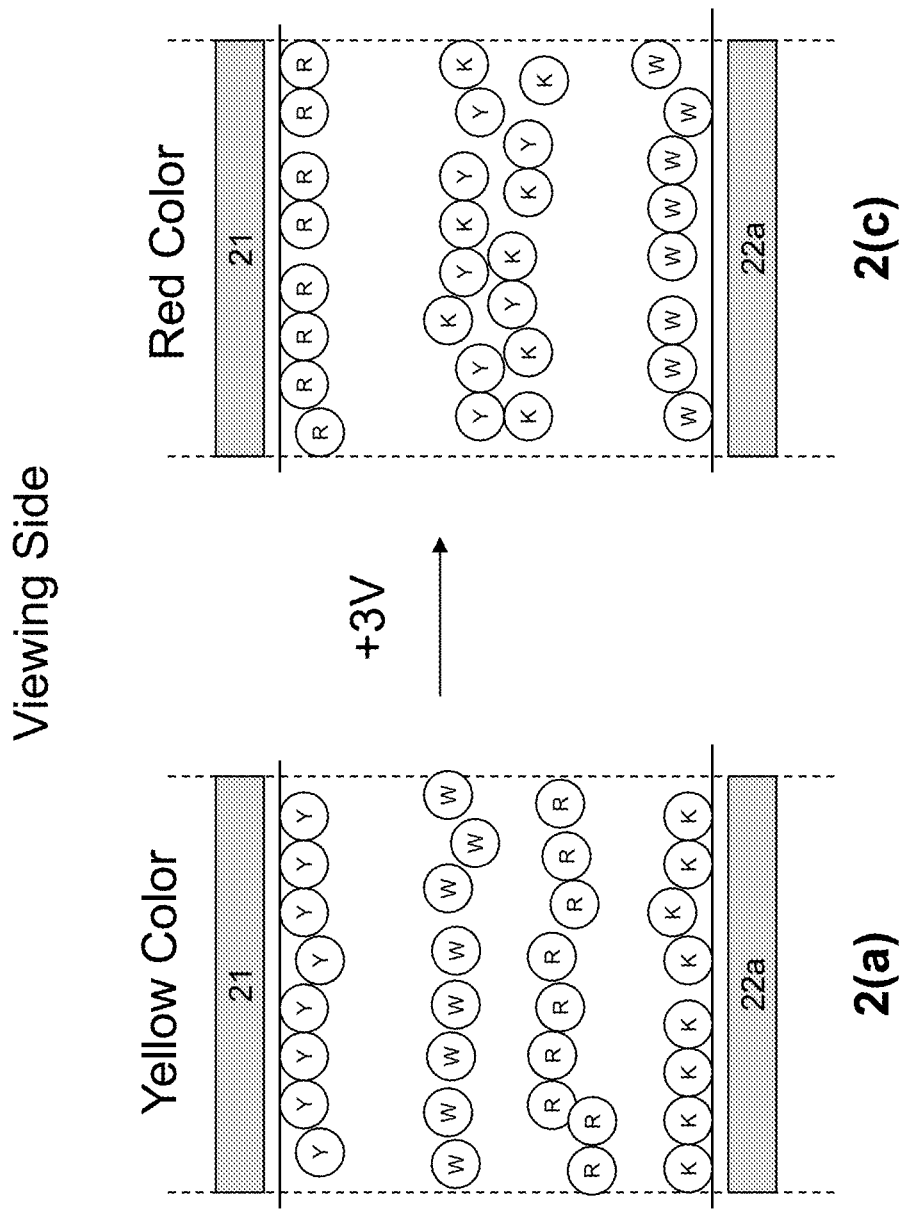
Figure 3:
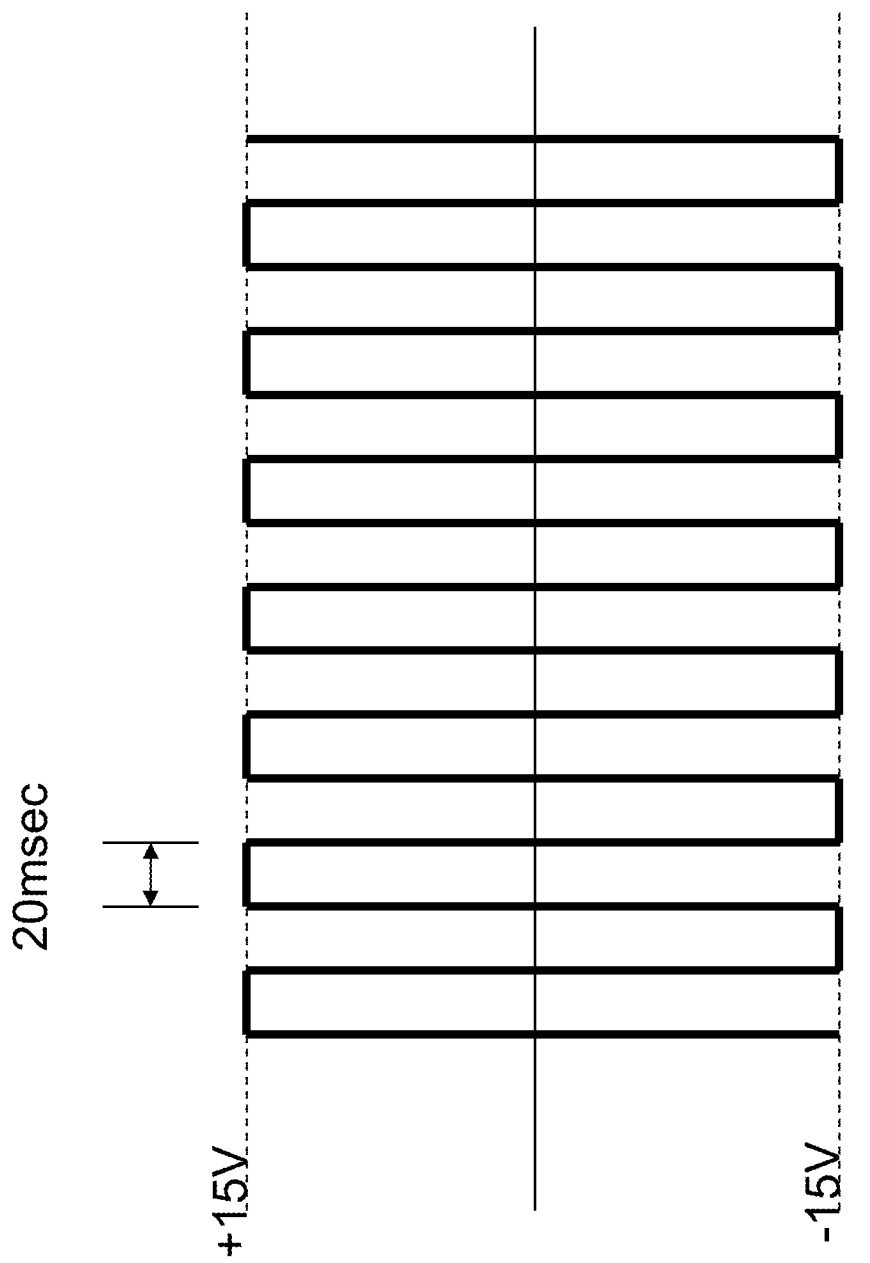

FIGS. 2-1, 2-2 and 2-3 illustrate the four color states which can be displayed at the viewing surface of each pixel of the display layer shown in FIG. 1 and the transitions between them. As previously noted, the high positive particles are of a black color (K); the high negative particles are of a yellow color (Y); the low positive particles are of a red color (R); and the low negative particles are of a white color (W).

In FIG. 2-1, when a high negative driving voltage (referred to below as $V_{H2}$, e.g., −15V) is applied to the pixel electrode 22a (hereinafter, it will be assumed that the common electrode 21 will be maintained at 0V, so in this case the common electrode is strongly positive relative to the pixel electrode) for a time period of sufficient length, an electric field is generated to cause the high negative yellow particles to be driven adjacent the common electrode 21 and the high positive black particles driven adjacent the pixel electrode 22a to produce the state designated 2(a) in FIG. 2-1.

The low positive red R and low negative white W particles, because they carry weaker charges, move slower than the higher charged black and yellow particles and as a result, they stay in the middle of the pixel, with white particles above the red particles, and with both masked by the yellow particles and therefore not visible at the viewing surface. Thus, a yellow color is displayed at the viewing surface.

Conversely, when a high positive driving voltage (referred to below as $V_{H1}$, e.g., +15V) is applied to the pixel electrode 22a (so that the common electrode 21 is strongly negative relative to the pixel electrode) for a time period of sufficient length, an electric field is generated to cause the high positive black particles to be driven adjacent the common electrode 21 and the high negative yellow particles adjacent the pixel electrode 22a. The resulting state, designated 2(b) in FIG. 2-1 is the exact inverse of state 2(a) and a black color is displayed at the viewing surface.

FIG. 2-2 illustrates the manner in which the low positive (red) particles are displayed at the viewing surface of the display layer shown in FIG. 1. The process starts from the (yellow) state 2(a) shown in FIG. 2-1 and repeated on the left side of FIG. 2-2. A low positive voltage ($V_{L1}$, e.g., +3V) is applied to the pixel electrode 22a (i.e., the common electrode 21 is made slightly negative with respect to the pixel electrode) for a time period of sufficient length to cause the high negative yellow particles to move towards the pixel electrode 22a while the high positive black move towards the common electrode 21. However, when the yellow and black particles meet intermediate the pixel and common electrodes as shown in state 2(c) in FIG. 2-2, they remain at the intermediate position because the electric field generated by the low driving voltage is not strong enough to overcome the attractive forces between them. As shown, the yellow and black particles stay intermediate the pixel and common electrodes in a mixed state.

The term "attractive force" as used herein, encompasses electrostatic interactions, linearly dependent on the particle charge potentials, and the attractive force can be further enhanced by other forces, such as Van der Waals forces, hydrophobic interactions and the like.

Obviously, attractive forces also exist between the low positive red particles and the high negative yellow particles, and between the low negative white particles and the high positive black particles. However, these attractive forces are not as strong as the attractive forces between the black and yellow particles, and thus the weak attractive forces on the red and white particles can be overcome by the electric field generated by the low driving voltage, so that the low charged particles and the high charged particles of opposite polarity can be separated. The electric field generated by the low driving voltage is also sufficient to separate the low negative white and low positive red particles, thereby causing the red particles to move adjacent the common electrode 21 and the white particles to move adjacent the pixel electrode 22a. As a result, the pixel displays a red color, while the white particles lie closest to the pixel electrode, as shown at 2(c).

FIG. 2-3 illustrates the manner in which the low negative (white) particles are displayed at the viewing surface of the display shown in FIG. 1. The process starts from the (black) state 2(b) shown in FIG. 2-1 and repeated on the left side of FIG. 2-3. A low negative voltage ($V_{L2}$, e.g., −3V) is applied to the pixel electrode (i.e., the common electrode is made slightly positive with respect to the pixel electrode) for a time period of sufficient length to cause the high positive black particles to move towards the pixel electrode 22a while the high negative yellow particles move towards the common electrode 21. However, when the yellow and black particles meet intermediate the pixel and common electrodes as shown at 2(d), they remain at the intermediate position because the electric field generated by the low driving voltage is not strong enough to overcome the attractive forces between them. Thus, as previously discussed with reference to FIG. 2-2, the yellow and black particles stay intermediate the pixel and common electrodes in a mixed state.

As discussed above with reference to FIG. 2-2, attractive forces also exist between the low positive red particles and the high negative yellow particles, and between the low negative white particles and both the high positive black particles. However, these attractive forces are not as strong as the attractive forces between the black and yellow particles, and thus the weak attractive forces on the red and white particles can be overcome by the electric field generated by the low driving voltage, so that the low charged particles and the high charged particles of opposite polarity can be separated. The electric field generated by the low driving voltage is sufficient to separate the low negative white and low positive red particles, thereby causing the white particles to move adjacent the common electrode 21 and the red particles to move adjacent the pixel electrode 22a. As a result, the pixel displays a white color, while the red particles lie closest to the pixel electrode, as shown at 2(d).

Although in the display layer shown in FIGS. 1 and 2-1 to 2-3, the black particles (K) carry a high positive charge, the yellow particles (Y) carry a high negative charge, the red (R) particles carry a low positive charge and the white particles (W) carry a low negative charge, in practice, the particles carrying a high positive charge, or a high negative charge, or a low positive charge or a low negative charge may be of any colors. All of these variations are intended to be within the scope of this application.

It should also be noted that the low potential difference applied to reach the color states 2(c) and 2(d) in FIGS. 2-2 and 2-3 respectively may be about 5% to about 50% of the high potential difference required to drive the pixel from the color state of high positive particles to the color state of the high negative particles, or vice versa, as shown in FIG. 2-1.

Although for ease of illustration, FIGS. 1 and 2-1 to 2-3 show the display layer as unencapsulated, the electrophoretic fluid may be filled into display cells, which may be cup-like microcells as described in U.S. Pat. No. 6,930,818. The display cells may also be other types of micro-containers, such as microcapsules, microchannels or equivalents, regardless of their shapes or sizes. All of these are within the scope of the present application.

It will readily be apparent to those skilled in imaging science that if "clean", well saturated colors are to be obtained in the various color states illustrated in FIGS. 2-1 to 2-3, all non-black and non-white particles used in the electrophoretic medium should be light-reflecting rather than light-transmissive. (White particles are inherently light-scattering, while black particles are inherently light-absorbing.) For example, in the red color state 2(c) shown in FIG. 2-2, if the red particles were substantially light-transmissive, a substantial proportion of the light entering the electrophoretic layer through the viewing surface would pass through the red particles and a proportion of this transmitted light would be reflected back from the yellow particles "behind" (i.e., below as illustrated in FIG. 2-2) the red particles. The overall effect would be serious "contamination" of the desired red color with a yellow tinge, a highly undesirable result.

In order to ensure both color brightness and color purity, a shaking waveform may be applied prior to driving the display layer from one color state to another color state. FIG. 3 is a voltage versus time graph of such a shaking waveform. The shaking waveform may consist of repeating a pair of opposite driving pulses for many cycles. For example, the shaking waveform may consist of a +15V pulse for 20 msec and a −15V pulse for 20 msec, with this pair of pulses being repeated 50 times. The total duration of such a shaking waveform would be 2000 msec. For ease of illustration, FIG. 3 illustrates only seven pairs of pulses. In practice, there may be at least 10 repetitions (i.e., ten pairs of positive and negative pulses). Similarly, all subsequent drawings showing shaking waveforms simplify the shaking waveform in the same manner. The shaking waveform may be applied regardless of the optical state prior to a driving voltage being applied. After the shaking waveform is applied, the optical state (at either the viewing surface or the second surface, if visible) will not be a pure color, but will be a mixture of the colors of the various types of pigment particles.

Each of the driving pulses in the shaking waveform is applied for not exceeding 50% (or not exceeding 30%, 10% or 5%) of the driving time required for driving from the color state of the high positive particles to the color state of the high negative particles, or vice versa. For example, if it takes 300 msec to drive a display device from the color state 2(b) (see FIG. 2-1) of the high positive particles to the color state 2(a) of the high negative particles, or vice versa, the shaking waveform may consist of positive and negative pulses, each applied for not more than 150 msec. In practice, it is preferred that the pulses be shorter.

For present purposes, a high driving voltage ($V_{H1}$ or $V_{H2}$) is defined as a driving voltage which is sufficient to drive a pixel from the color state of high positive particles to the color state of high negative particles, or vice versa (see FIGS. 2-1). A low driving voltage ($V_{L1}$ or $V_{L2}$) is defined as a driving voltage which may be sufficient to drive a pixel to the color state of low charged particles from the color state of high charged particles (see FIGS. 2-2 and 2-3). In general, the magnitude of $V_L$ (e.g., $V_{L1}$ or $V_{L2}$) is less than 50%, or preferably less than 40%, of the amplitude of $V_H$ (e.g., $V_{H1}$ or $V_{H2}$).

Figure 4:
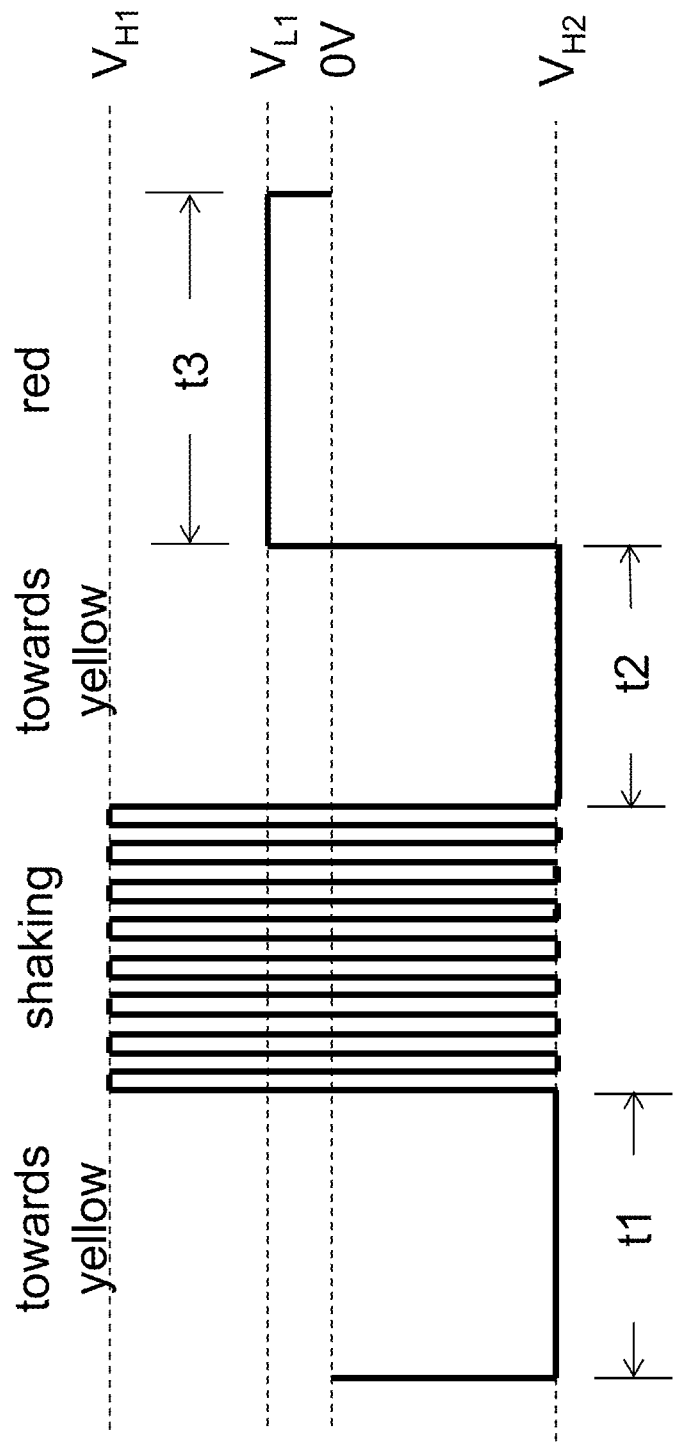
FIG. 4 illustrates a waveform which can be used to cause the display layer shown in FIG. 1 to effect the transition shown in FIG. 2-2 to display the red color of low charged positive particles.

FIG. 4 illustrates a waveform which may be used to effect the yellow to red (high negative to low positive) transition of FIG. 2-2. In the waveform of FIG. 4, a high negative driving voltage ($V_{H2}$, e.g., −15V) is applied for a period of t1 to drive the pixel towards the yellow state 2(a) (see FIG. 2-2). This initial application of a high negative driving voltage may be omitted but is preferably included to ensure that the entire waveform of FIG. 4 is DC balanced. (The term "DC balanced" is used herein to mean that the integral of the driving voltage applied to a pixel with respect to time taken over an entire waveform is substantially zero.) A shaking waveform is then applied, followed by application of the high negative driving voltage ($V_{H2}$) for a period of t2, thus ensuring that the pixel is in the yellow state 2(a) shown in FIG. 2-2. From this yellow state, the pixel is driven to the red state by applying a low positive driving voltage ($V_{L1}$, for example +3V) for a period of t3, to effect the yellow-to-red transition shown in FIG. 2-2. The period t2 is sufficient to drive the pixel to the yellow state when $V_{H2}$ is applied and the period t3 is sufficient to drive the pixel to the red state from the yellow state when $V_{L1}$ is applied.

Figure 5:
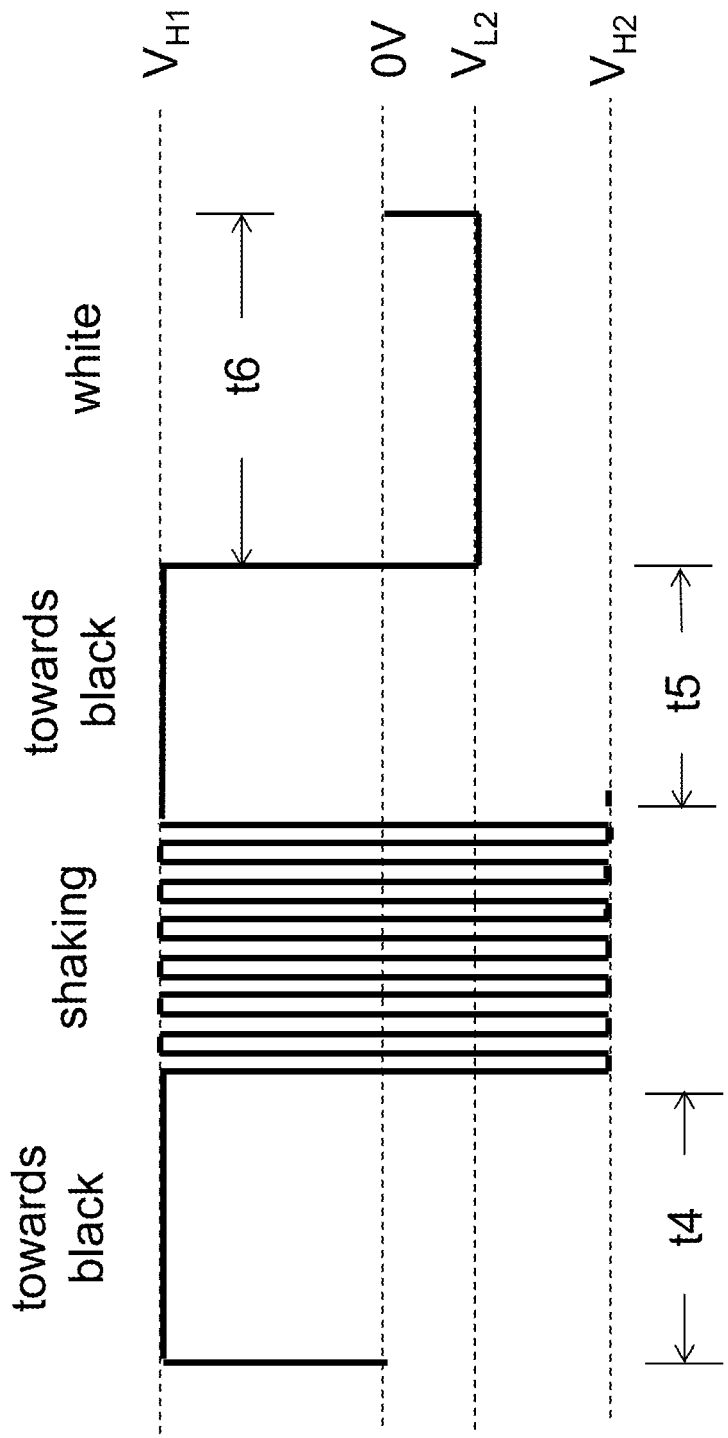
FIG. 5 illustrate a waveform which can be used to cause the display layer shown in FIG. 1 to effect the transition shown in FIG. 2-3 to display the white color of low charged negative particles.

FIG. 5 illustrates a waveform which may be used to effect the black-to-white (high positive to low negative) transition of FIG. 2-3. In the waveform of FIG. 5, which is essentially an inverted version of the waveform of FIG. 4, a high positive driving voltage ($V_{H1}$, for example +15V) is first applied for a period of t4. This initial application of a high positive driving voltage may be omitted but is preferably included to ensure that the entire waveform of FIG. 5 is DC balanced. A shaking waveform is then applied, followed by application of the high positive driving voltage ($V_{H1}$) for a period of t5, thus ensuring that the pixel is in the black state shown in FIG. 3-3. From this black state, the pixel is driven to the white state by applying a low negative driving voltage ($V_{L2}$, for example −3V) for a period of t6, to effect the black-to-white transition shown in FIG. 2-3. The period t5 is sufficient to drive the pixel to the black state when $V_{H1}$ is applied and the period t6 is sufficient to drive the pixel to the white state from the black state when $V_{L2}$ is applied. The waveform of FIG. 5 may be DC balanced.

The entire waveform of FIG. 4 or of FIG. 5 may be DC balanced.

Figure 6:
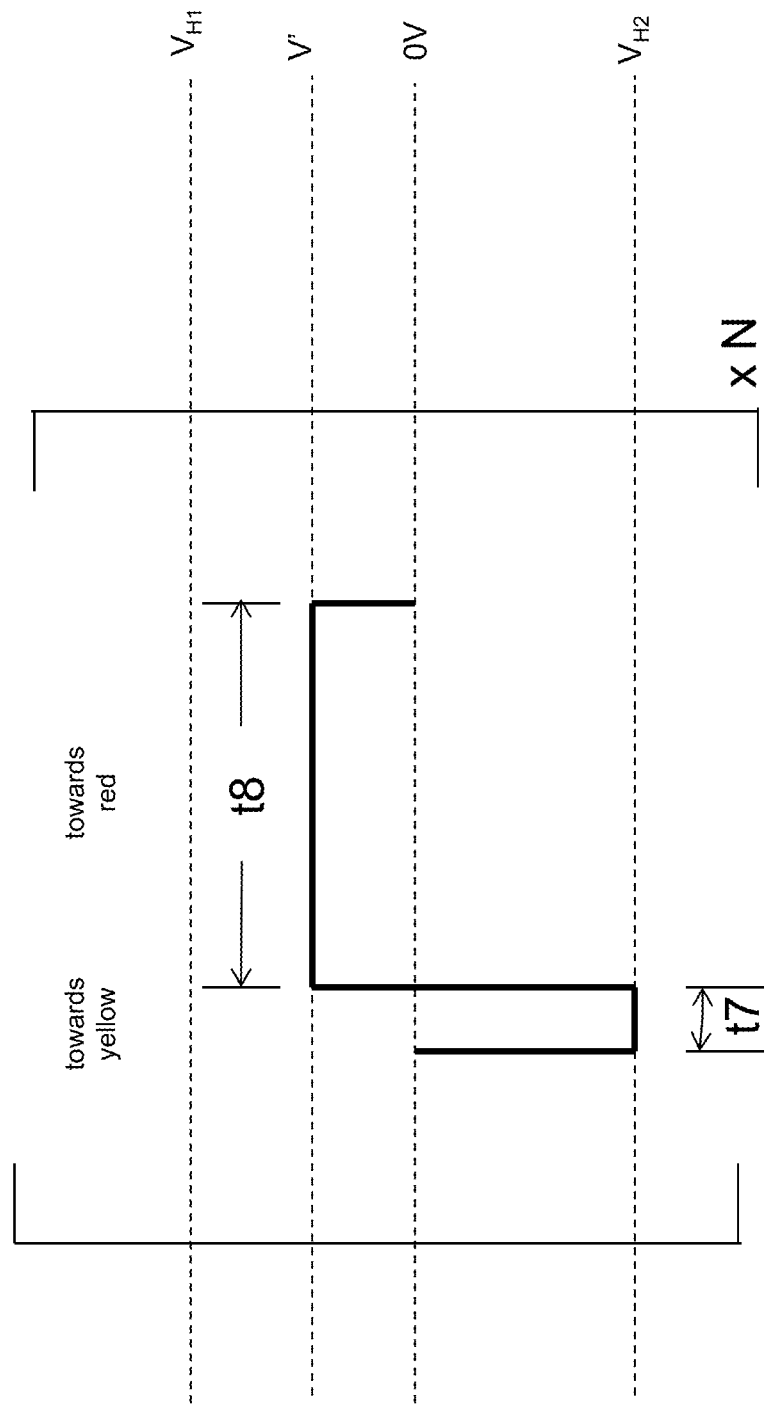
FIG. 6 illustrates an alternative waveform which may be used in place of part of the waveform shown in FIG. 4.

FIG. 6 illustrates a waveform which may be used to replace the portion of the waveform of FIG. 4 occurring in period t3. In the first portion of the waveform of FIG. 6, the high negative driving voltage ($V_{H2}$) is applied to a pixel for a period of t7 to drive the pixel towards the yellow state, then a positive driving voltage (+V') is applied for a period of t8 to drive the pixel towards the red state. The magnitude of V' is lower than that of $V_H$ (e.g., $V_{H1}$ or $V_{H2}$). The magnitude of +V' may be less than 50% of the magnitude of $V_H$, and t8 may greater than t7, for example, t7 may be in the range of 20-400 msec and t8 may be ≥200 msec. The waveform of FIG. 6 is repeated for at least 2 cycles (N≥2), preferably at least 4 cycles and more preferably at least 8 cycles. The red color becomes more intense after each driving cycle.

Figure 7:
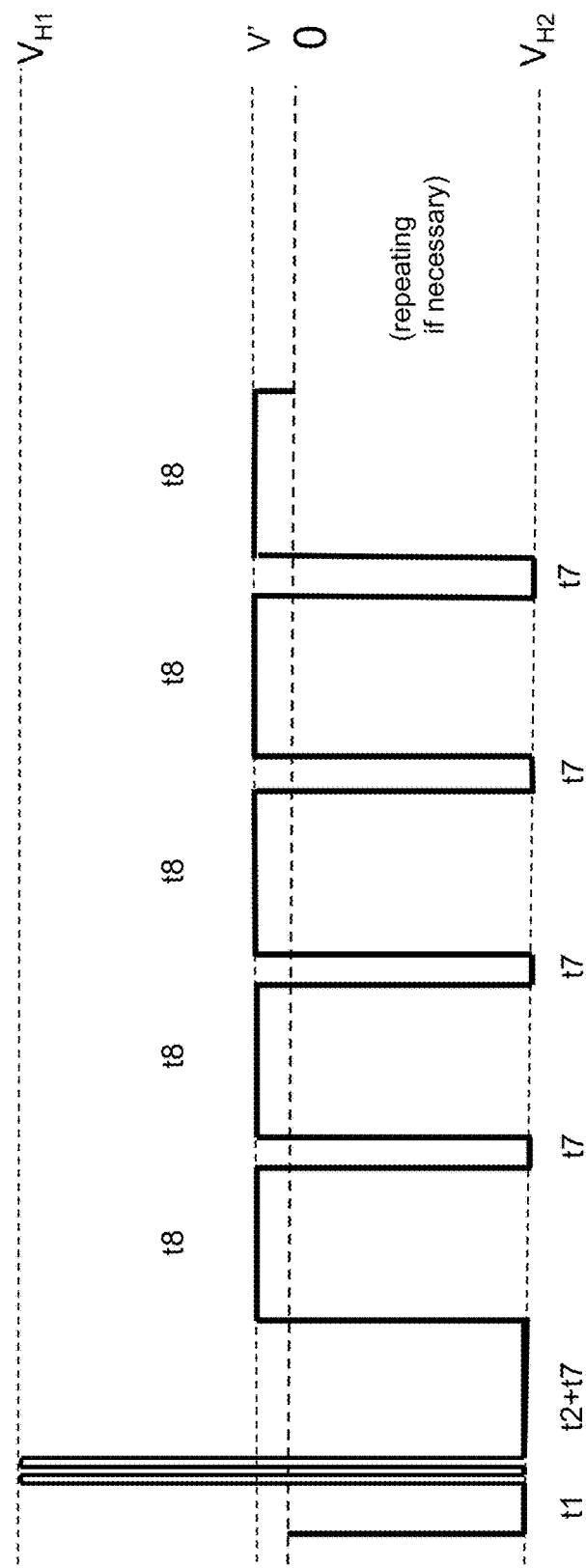
FIG. 7 illustrates a waveform produced by replacing the last part of the waveform shown in FIG. 4 with multiple repetitions of the waveform shown in FIG. 6.

As already noted, the waveform of FIG. 6 may be used to replace the portion of the waveform of FIG. 4 occurring in period t3. FIG. 7 illustrates a waveform in which the portion of the waveform of FIG. 4 occurring in period t3 is replaced by five cycles of the waveform of FIG. 6 (more or fewer cycles may of course be used). In other words, the waveform of FIG. 7 comprises driving towards yellow for a period of t1 (cf. FIG. 4), a shaking waveform, driving towards yellow for a period of t2 (again, cf. FIG. 4), and then applying multiple cycles of the waveform of FIG. 6.

Figure 8:
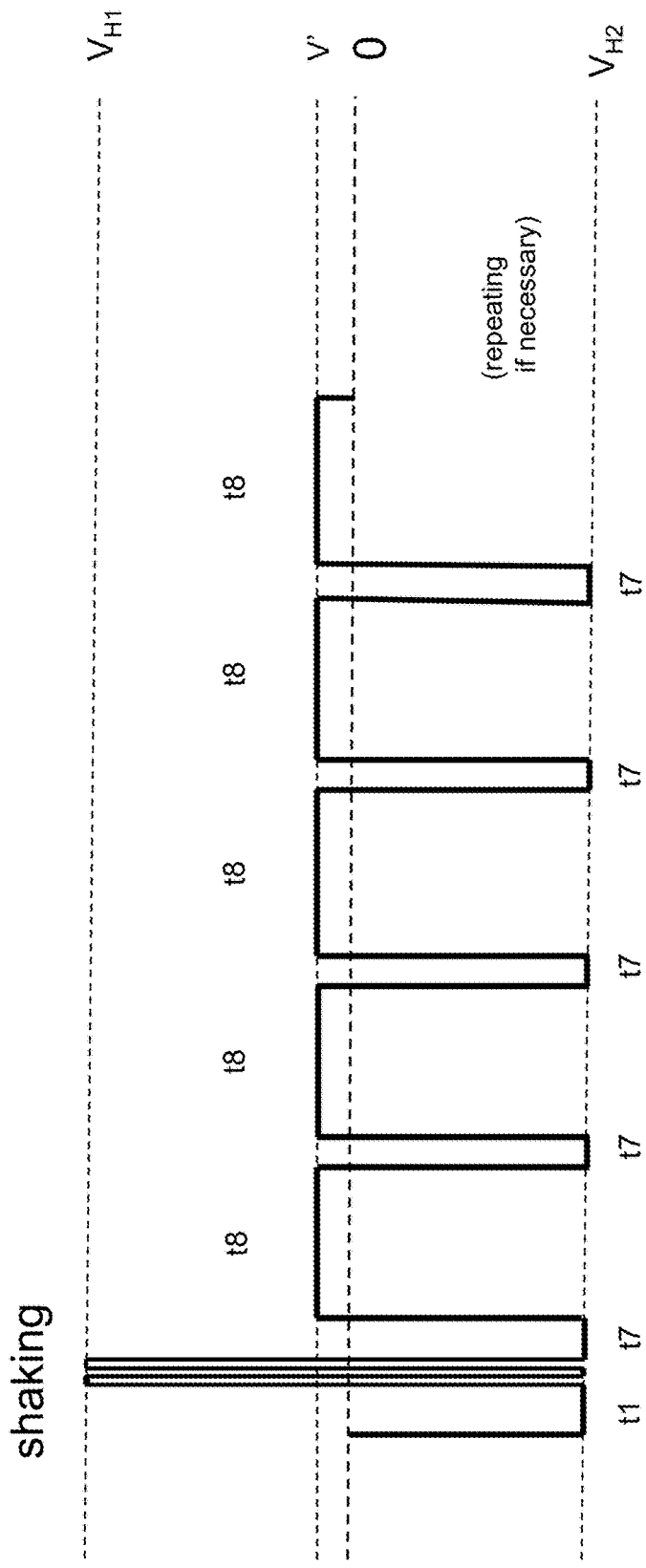
FIG. 8 illustrates a modified version of the waveform shown in FIG. 7.

FIG. 8 illustrates a waveform similar to that of FIG. 7 but in which the step of driving towards the yellow state for the period of t2 is eliminated, so that the waveform of FIG. 8 transitions from the shaking waveform immediately to the waveform of FIG. 6. The waveforms of FIGS. 7 and 8 may each be DC balanced.

Figure 9:
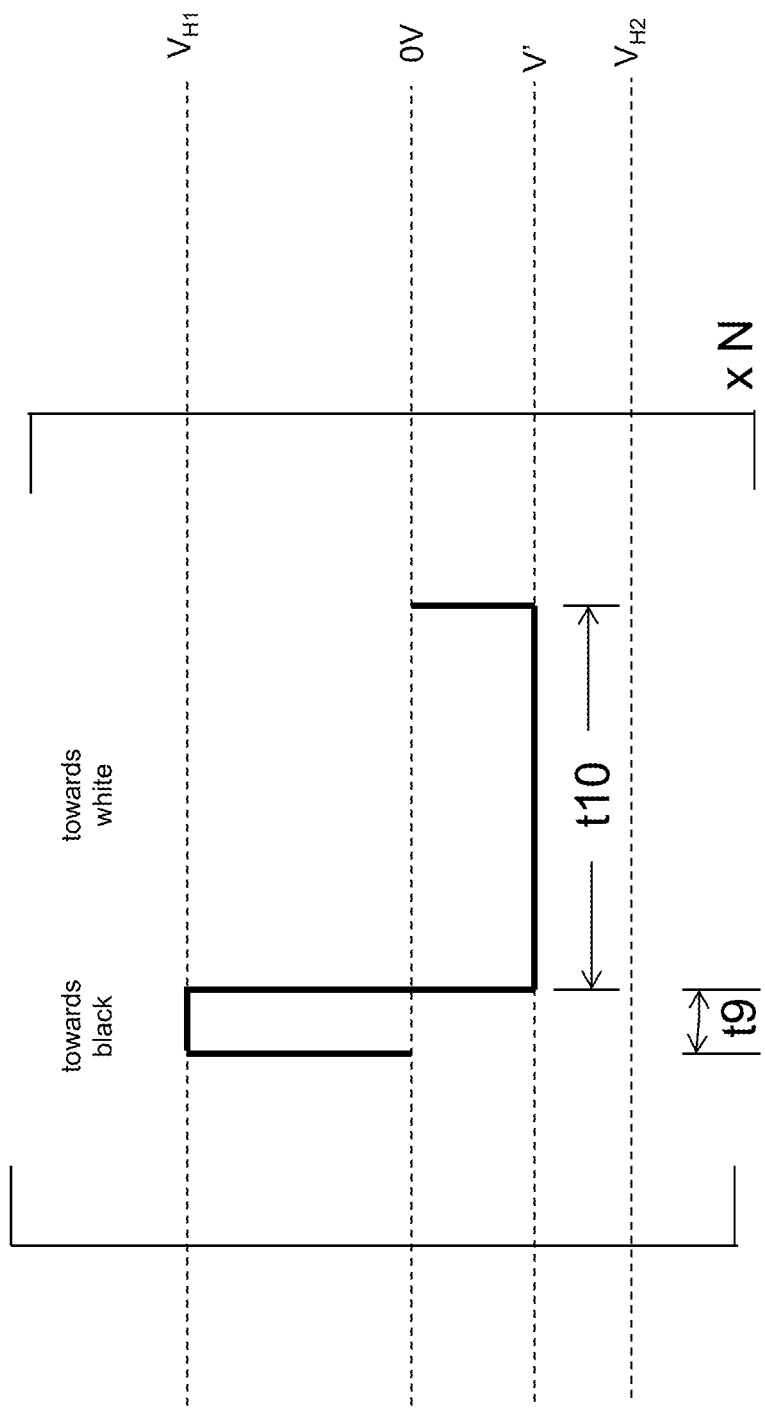
FIG. 9 illustrates an alternative waveform which may be used in place of part of the waveform shown in FIG. 5.

FIG. 9 illustrates a waveform which may be used to replace the portion of the waveform of FIG. 5 occurring in period t6. In the first portion of the waveform of FIG. 5, which is essentially an inverted version of the waveform of FIG. 4, the high positive driving voltage ($V_{H1}$) is applied to a pixel for a period of t9 to drive the pixel towards the black state, then a negative driving voltage (−V') is applied for a period of t10 to drive the pixel towards the white state. The magnitude of −V' is lower than that of $V_H$ (e.g., $V_{H1}$ or $V_{H2}$) The magnitude of −V' may be less than 50% of the magnitude of $V_H$, and t10 may greater than t9, for example, t9 may be in the range of 20-400 msec and t10 may be ≥200 msec. The waveform of FIG. 9 is repeated for at least 2 cycles (N≥2), preferably at least 4 cycles and more preferably at least 8 cycles. The white color becomes more intense after each driving cycle.

Figure 10:
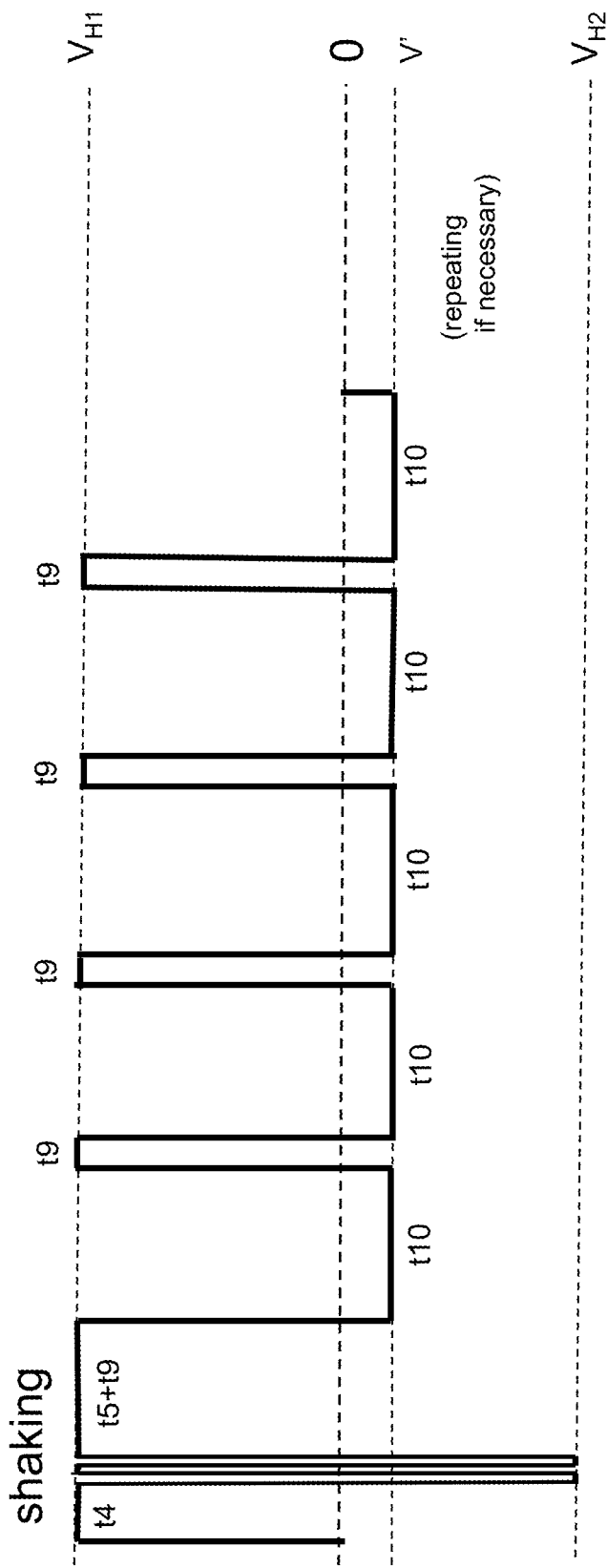
FIG. 10 illustrates a waveform produced by replacing the last part of the waveform shown in FIG. 5 with multiple repetitions of the waveform shown in FIG. 9.

As already noted, the waveform of FIG. 9 may be used to replace the portion of the waveform of FIG. 5 occurring in period t6. FIG. 10 illustrates a waveform in which the portion of the waveform of FIG. 5 occurring in period t6 is replaced by five cycles of the waveform of FIG. 9 (more or fewer cycles may of course be used). In other words, the waveform of FIG. 10 comprises driving towards black for a period of t4 (cf. FIG. 5), a shaking waveform, driving towards black for a period of t5 (again, cf. FIG. 5), and then applying multiple cycles of the waveform of FIG. 9.

Figure 11:
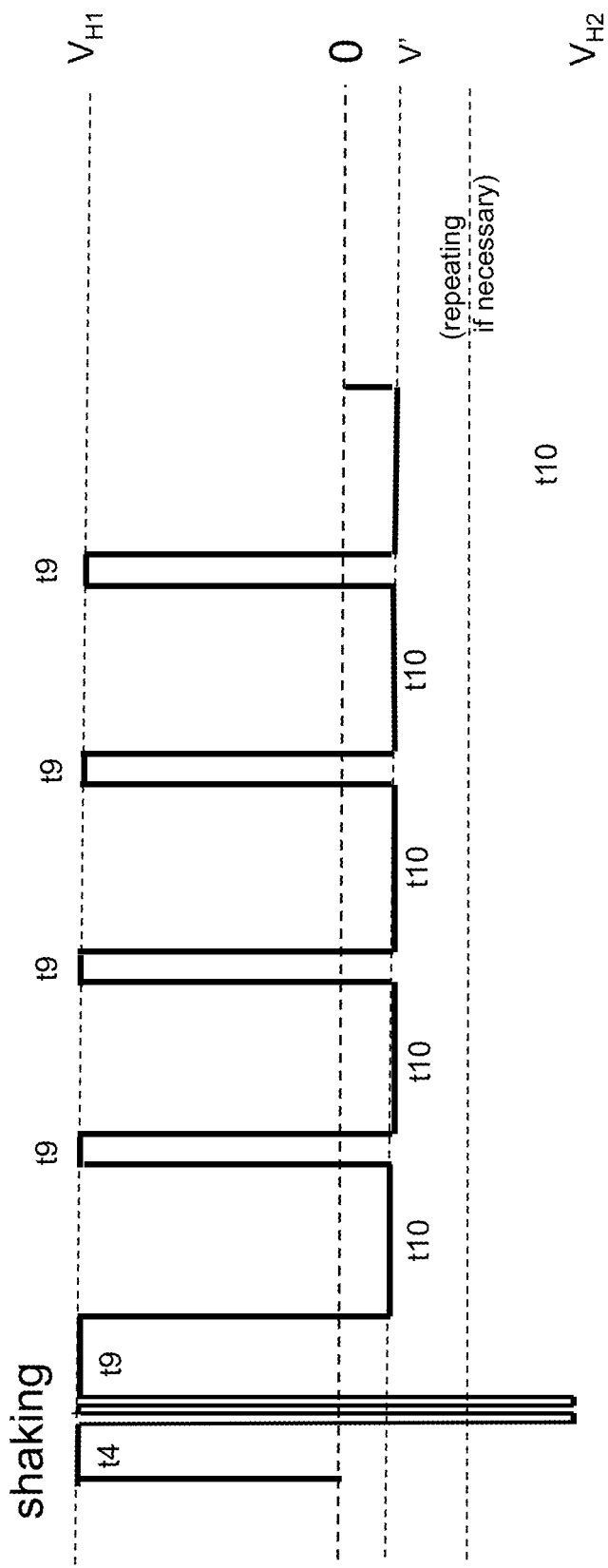
FIG. 11 illustrates a modified version of the waveform shown in FIG. 10.

FIG. 11 illustrates a waveform similar to that of FIG. 10 but in which the step of driving towards the black state for the period of t5 is eliminated, so that the waveform of FIG.

11 transitions from the shaking waveform immediately to the waveform of FIG. 9. The waveforms of FIGS. 10 and 11 may each be DC balanced.

Figure 12:
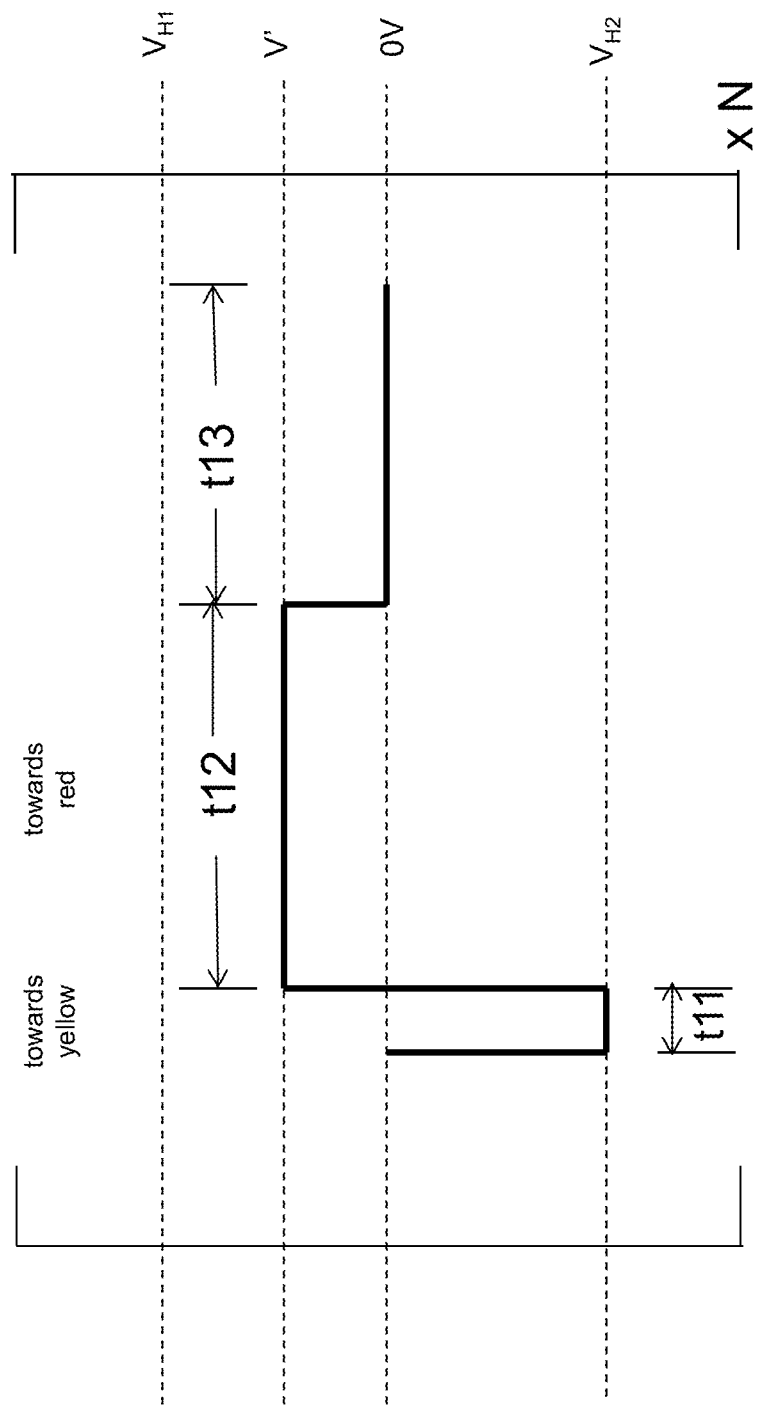
FIG. 12 illustrates a modified version of the waveform shown in FIG. 6 incorporating a period of no electric field.

FIG. 12 illustrates a waveform which may be used in place of the waveform of FIG. 6 to replace the portion of the waveform of FIG. 4 occurring in period t3. The waveform of FIG. 12 comprises driving towards yellow for an initial period of t11 (cf. period t7 in FIG. 6), followed by driving towards red for a period of t12 (cf. period t8 in FIG. 6), with t12 being longer than t11. However, in the waveform of FIG. 12, period t12 is followed by a wait period of t13 in which no driving voltage is applied. The waveform of FIG. 12 is designed to release the charge imbalance stored in the dielectric layers and/or at the interfaces between layers of different materials, in an electrophoretic display device, especially when the resistance of the dielectric layers is high, for example, at a low temperature. (As used herein, the term "low temperature" refers to a temperature below about 10° C.) The wait time presumably can dissipate the unwanted charge stored in the dielectric layers and cause the short pulse t11 for driving a pixel towards the yellow state and the longer pulse t12 for driving the pixel towards the red state to be more efficient. As a result, this alternative driving method will bring a better separation of the low charged (red) particles from the higher charged ones. The wait period t13 may be in the range of 5-5000 msec, depending on the resistance of the dielectric layers. The entire waveform of FIG. 8 may be repeated at least 2 times (N≥2), preferably at least 4 times and more preferably at least 8 times.

Figure 13:
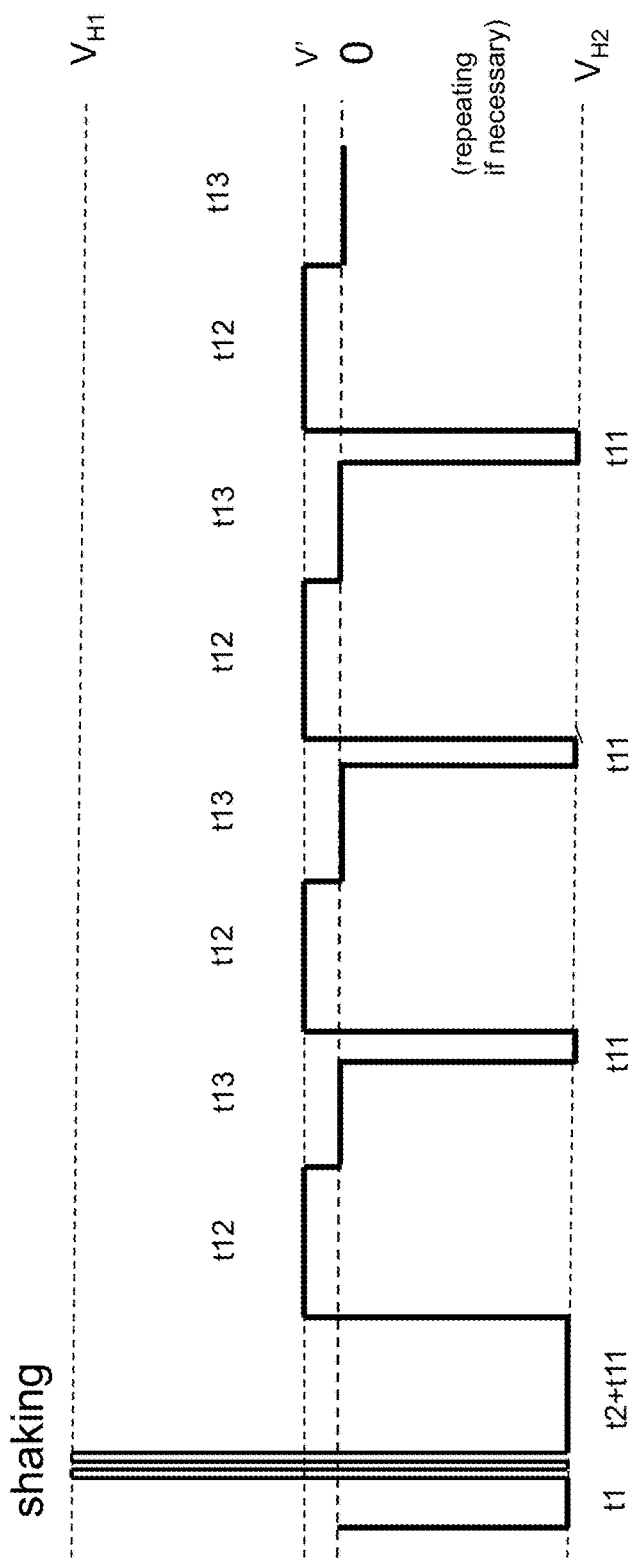
FIGS. 13 and 14 illustrates waveforms similar to those of FIGS. 7 and 8 respectively but using multiple repetitions of the waveform of FIG. 12 instead of the waveform of FIG. 6.

As already noted, the waveform of FIG. 12 may be used to replace the portion of the waveform of FIG. 4 occurring in period t3. FIG. 13 illustrates a waveform in which the portion of the waveform of FIG. 4 occurring in period t3 is replaced by four cycles of the waveform of FIG. 12 (more or fewer cycles may of course be used). In other words, the waveform of FIG. 13 comprises driving towards yellow for a period of t1 (cf. FIG. 4), a shaking waveform, driving towards yellow for a period of t2 (again, cf. FIG. 4), and then applying multiple cycles of the waveform of FIG. 12.

Figure 14:
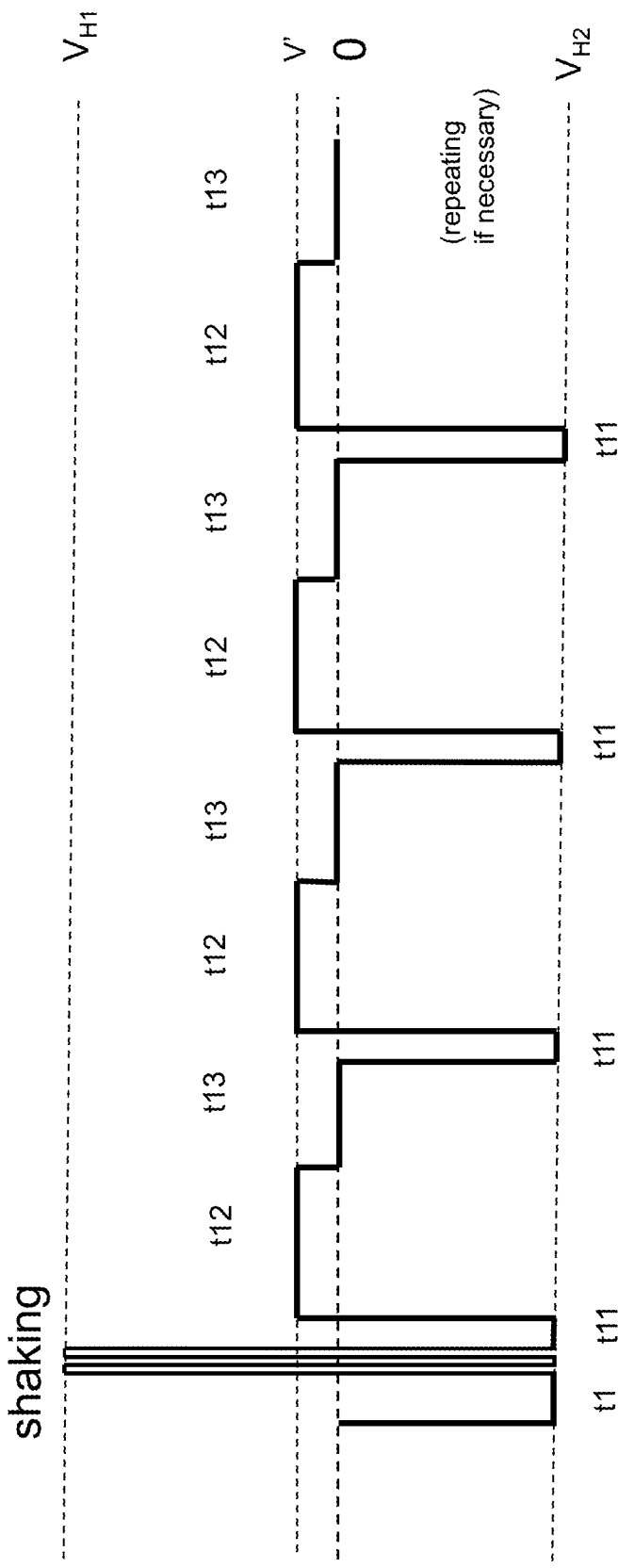

FIG. 14 illustrates a waveform similar to that of FIG. 13 but in which the step of driving towards the yellow state for the period of t2 is eliminated, so that the waveform of FIG. 14 transitions from the shaking waveform immediately to the waveform of FIG. 12. The waveforms of FIGS. 13 and 14 may each be DC balanced.

Figure 15:
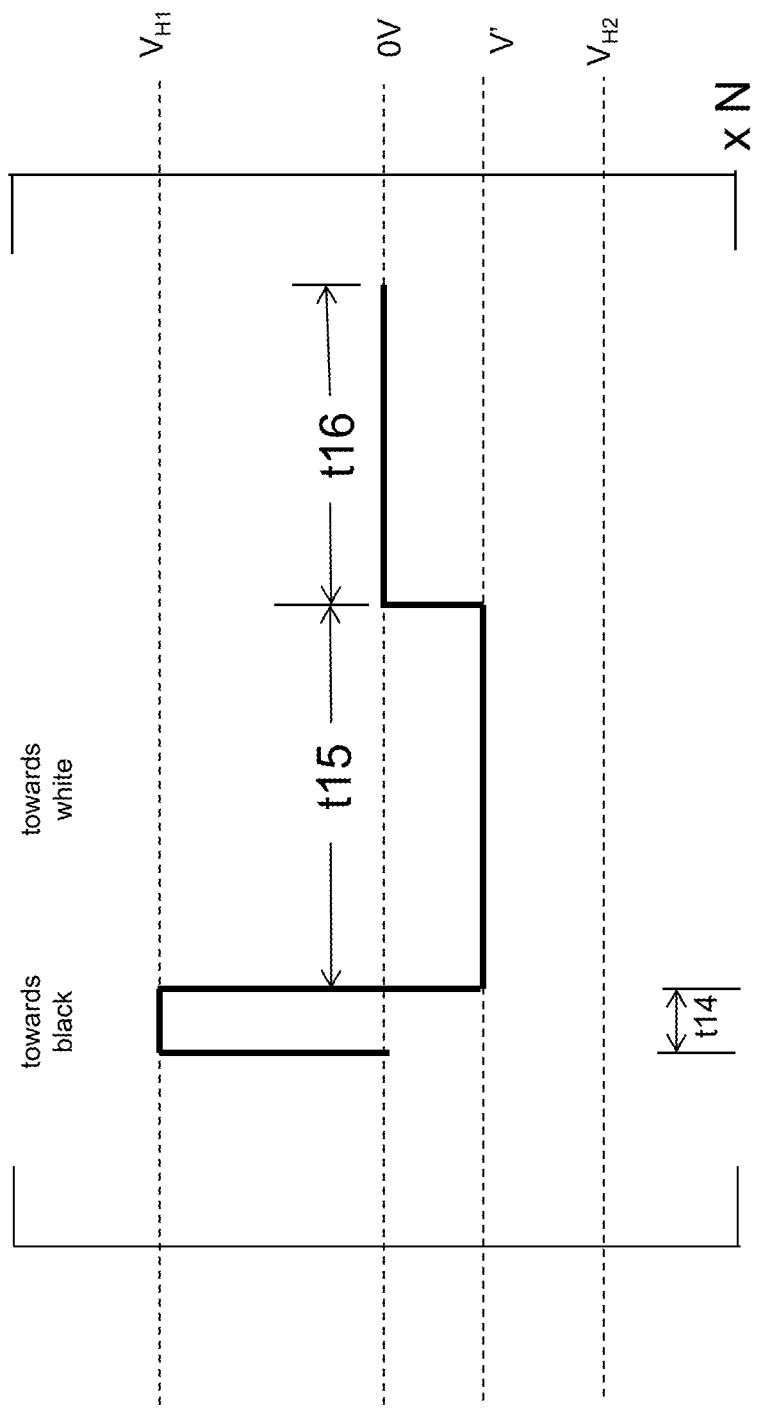
FIG. 15 illustrates a modified version of the waveform shown in FIG. 9 incorporating a period of no electric field.

FIG. 15 illustrates a waveform which may be used in place of the waveform of FIG. 9 to replace the portion of the waveform of FIG. 5 occurring in period t6. The waveform of FIG. 15, which is essentially an inverted version of the waveform of FIG. 12, comprises driving towards black for an initial period of t14 (cf. period t9 in FIG. 9), followed by driving towards white for a period of t15 (cf. period t10 in FIG. 9). However, in the waveform of FIG. 15, period t15 is followed by a wait period of t16 in which no driving voltage is applied. Like the waveform of FIG. 12, the waveform of FIG. 15 is designed to release the charge imbalance stored in the dielectric layers and/or at the interfaces between layers of different materials, in an electrophoretic display device, especially when the resistance of the dielectric layers is high, for example, at a low temperature. The wait time presumably can dissipate the unwanted charge stored in the dielectric layers and cause the short pulse t14 for driving a pixel towards the black state and the longer pulse t15 for driving the pixel towards the white state to be more efficient. The wait period t16 may be in the range of 5-5000 msec, depending on the resistance of the dielectric layers. The entire waveform of FIG. 15 may be repeated at least 2 times (N≥2), preferably at least 4 times and more preferably at least 8 times. The periods, t14 and t15 in FIG. 15, are similar to periods t9 and t10 in FIG. 9, respectively. In other words, t15 is greater than t14.

Figure 19:
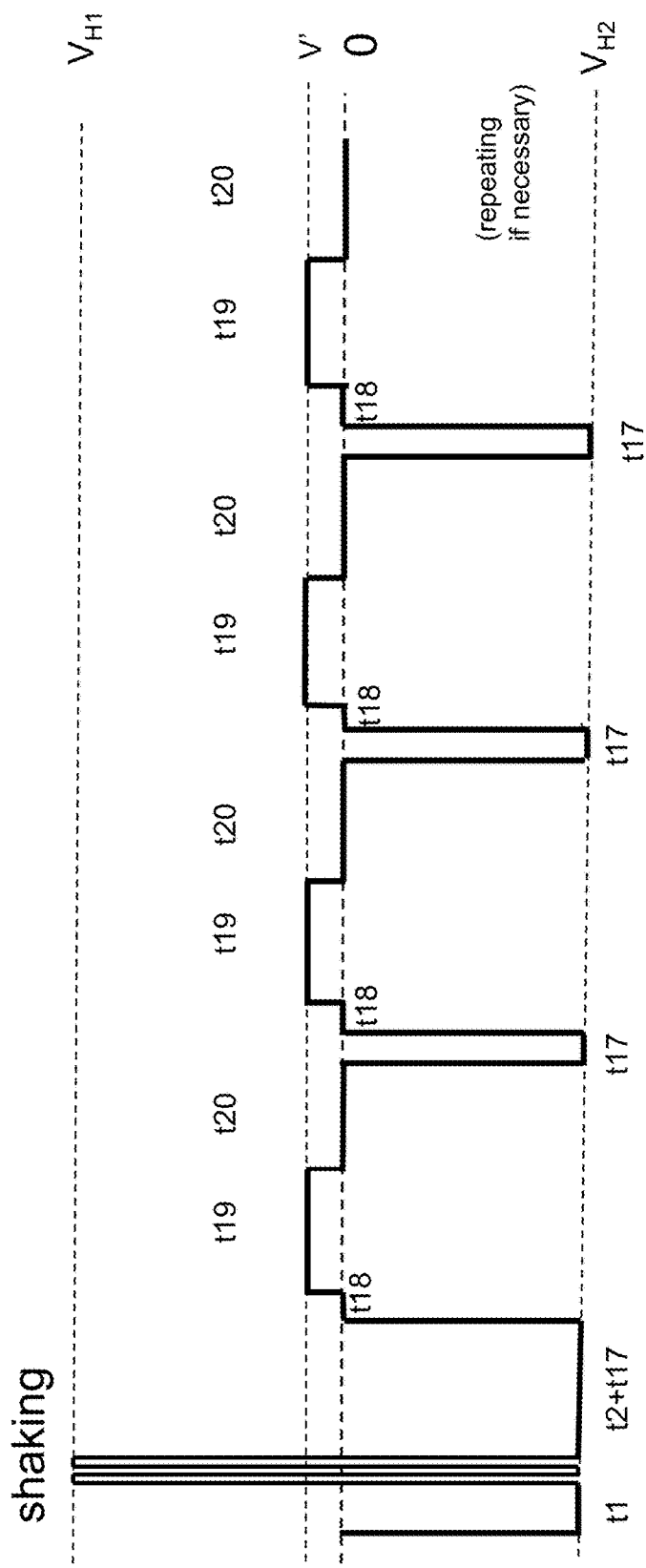
FIGS. 19 and 20 illustrates waveforms similar to those of FIGS. 13 and 14 respectively but using multiple repetitions of the waveform of FIG. 18 instead of the waveform of FIG. 12.

As already noted, the waveform of FIG. 15 may be used to replace the portion of the waveform of FIG. 5 occurring in period t6. FIG. 19 illustrates a waveform in which the portion of the waveform of FIG. 5 occurring in period t6 is replaced by four cycles of the waveform of FIG. 15 (more or fewer cycles may of course be used). In other words, the waveform of FIG. 16 comprises driving towards black for a period of t4 (cf. FIG. 5), a shaking waveform, driving towards black for a period of t5 (again, cf. FIG. 5), and then applying multiple cycles of the waveform of FIG. 15.

Figure 16:
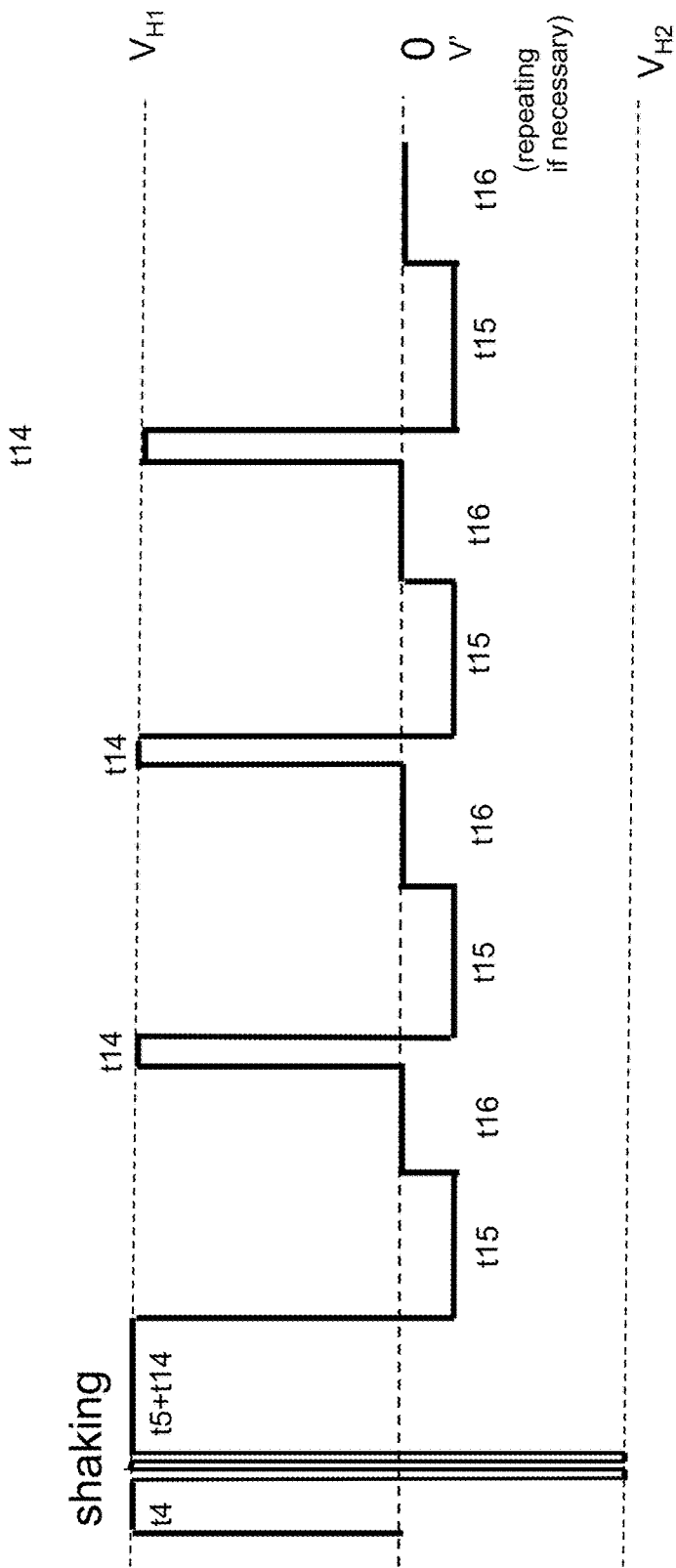
FIGS. 16 and 17 illustrates waveforms similar to those of FIGS. 10 and 11 respectively but using multiple repetitions of the waveform of FIG. 15 instead of the waveform of FIG. 9.
Figure 17:
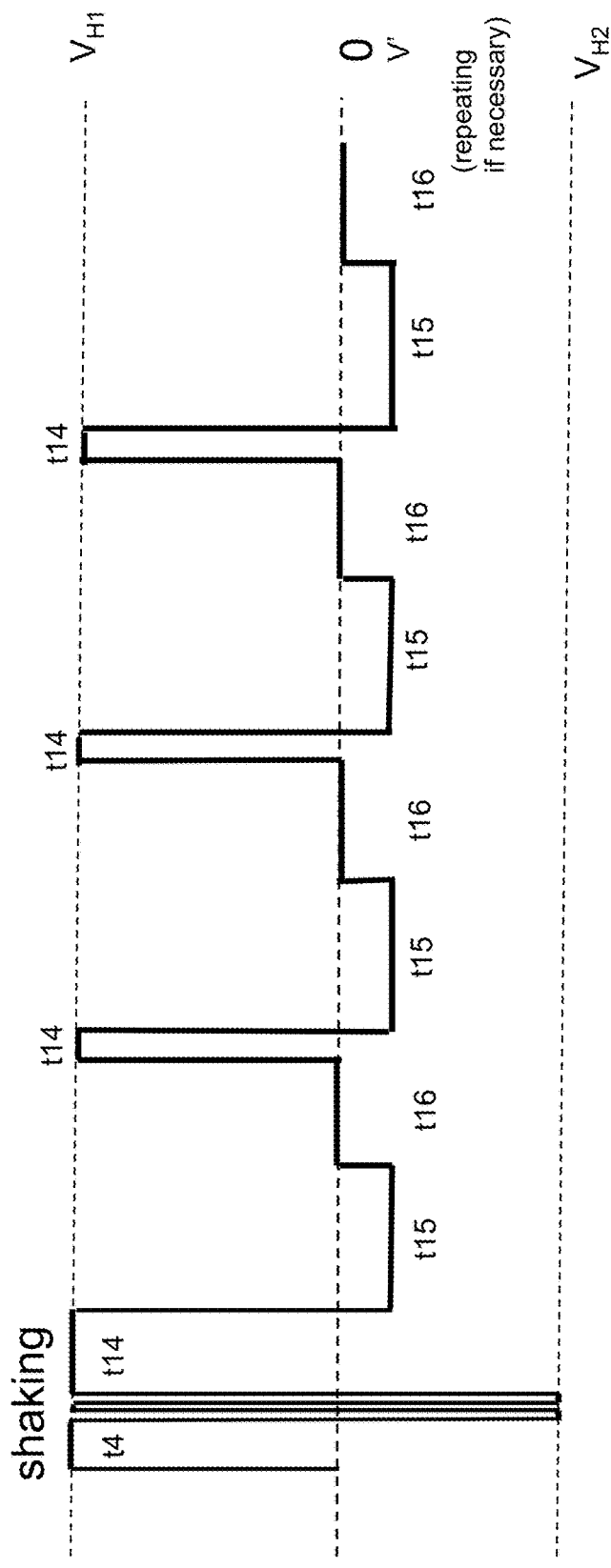

FIG. 17 illustrates a waveform similar to that of FIG. 16 but in which the step of driving towards the black state for the period of t5 is eliminated, so that the waveform of FIG. 17 transitions from the shaking waveform immediately to the waveform of FIG. 15. The waveforms of FIGS. 16 and 17 may each be DC balanced. The lengths of any of the driving periods may be temperature dependent.

Figure 18:
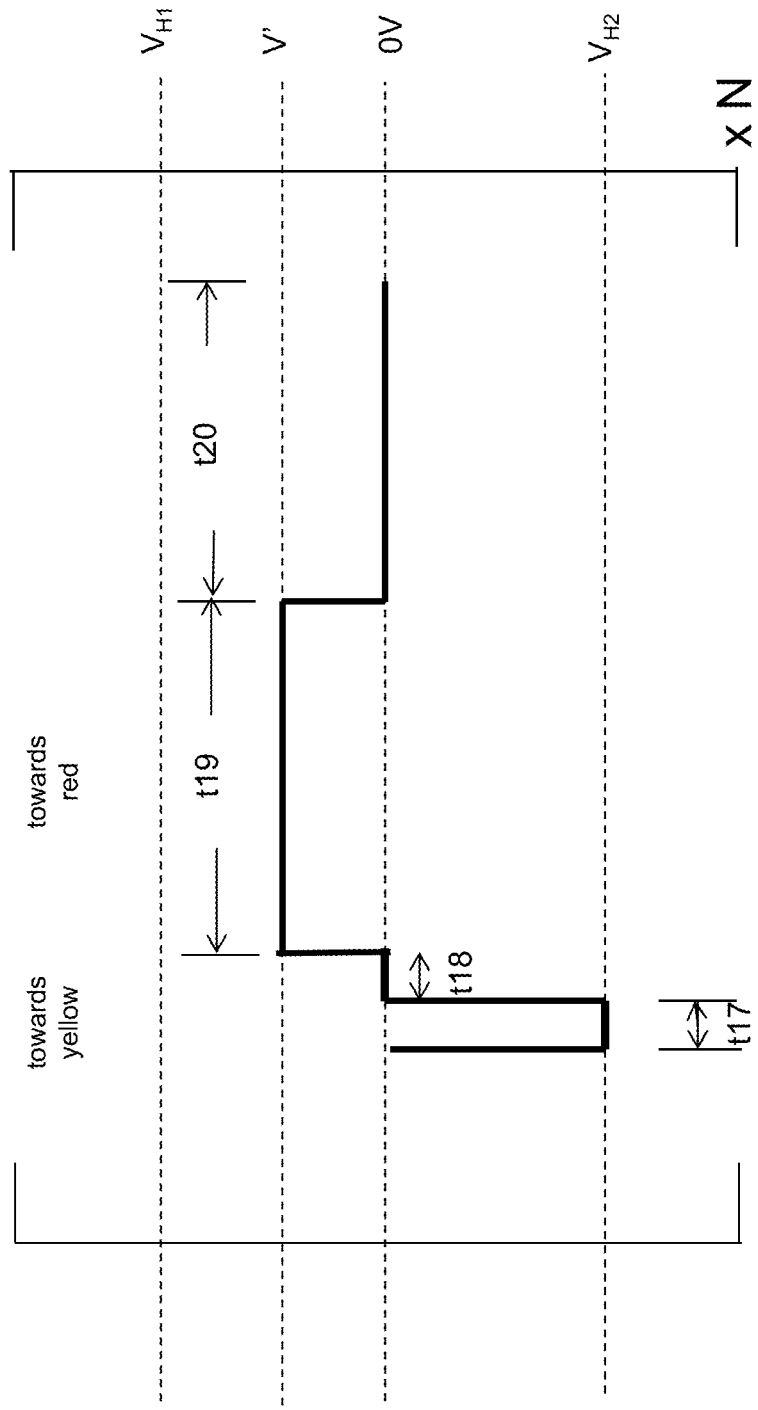
FIG. 18 illustrates a waveform derived from the waveform of FIG. 12 by incorporation of a second period of no electric field.

FIG. 18 illustrates a waveform which may be used in place of the waveform of FIG. 6 or 12 to replace the portion of the waveform of FIG. 4 occurring in period t3. The waveform of FIG. 18 comprises driving towards yellow for an initial period of t17 (cf. period t7 in FIG. 6), followed by a wait time of t18 during which no driving voltage is applied. The wait time of t18 is followed by driving towards red for a period of t19 (cf. period t8 in FIG. 6), followed by a wait period of t20 in which no driving voltage is applied (cf. period t13 in FIG. 12). The waveform of FIG. 18 may be repeated at least 2 times, preferably at least 4 times and more preferably at least 8 times.

In the waveform of FIG. 18, the first wait time t18 is very short while the second wait time t20 is longer. The period t17 is also shorter than the period t19. For example, t17 may be in the range of 20-200 msec; t18 may be less than 100 msec; t19 may be in the range of 100-200 msec; and t20 may be less than 1000 msec.

As already noted, the waveform of FIG. 18 may be used to replace the portion of the waveform of FIG. 4 occurring in period t3. FIG. 19 illustrates a waveform in which the portion of the waveform of FIG. 4 occurring in period t3 is replaced by four cycles of the waveform of FIG. 18 (more or fewer cycles may of course be used). In other words, the waveform of FIG. 19 comprises driving towards yellow for a period of t1 (cf. FIG. 4), a shaking waveform, driving towards yellow for a period of t2 (again, cf. FIG. 4), and then applying multiple cycles of the waveform of FIG. 18. As a general rule, the better the yellow state achieved at the end of period t2, the better the red state that will be displayed at the end of the waveform.

Figure 20:
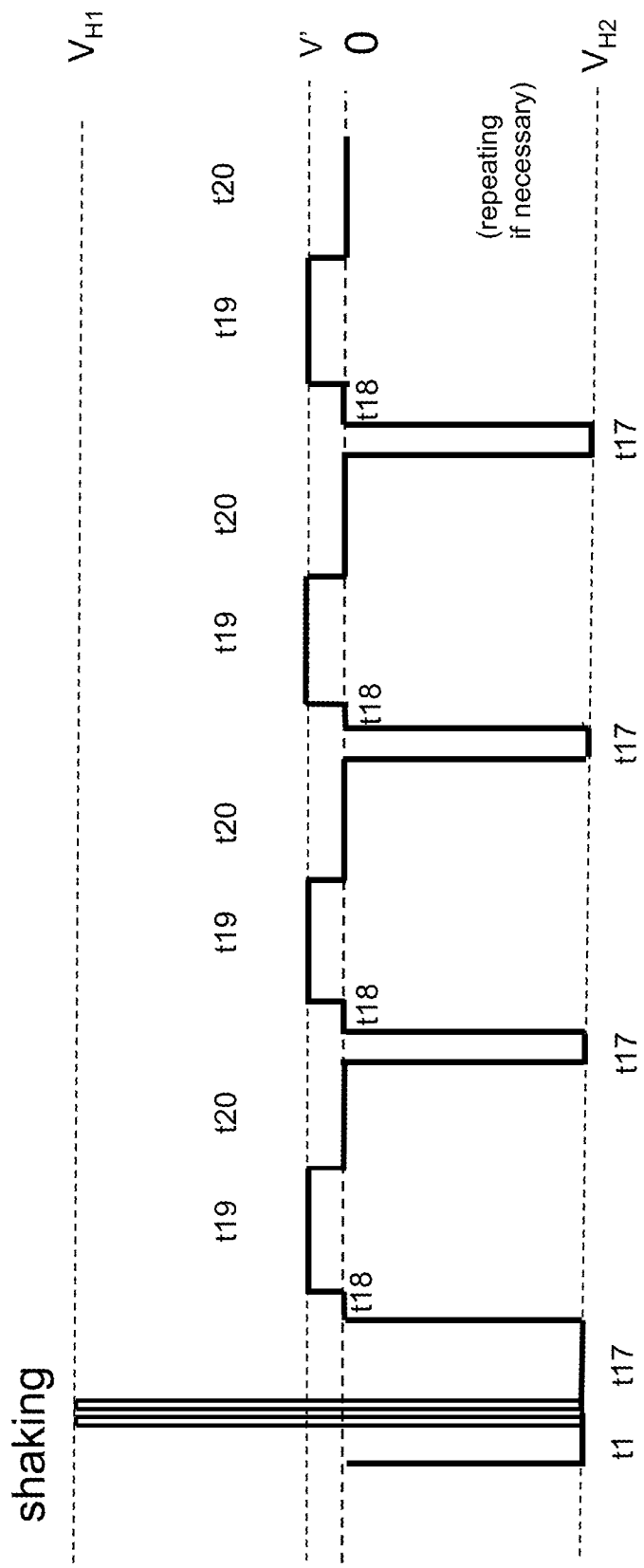

FIG. 20 illustrates a waveform similar to that of FIG. 19 but in which the step of driving towards the yellow state for the period of t2 is eliminated, so that the waveform of FIG. 20 transitions from the shaking waveform immediately to the waveform of FIG. 18. The waveforms of FIGS. 19 and 20 may each be DC balanced.

Figure 21:
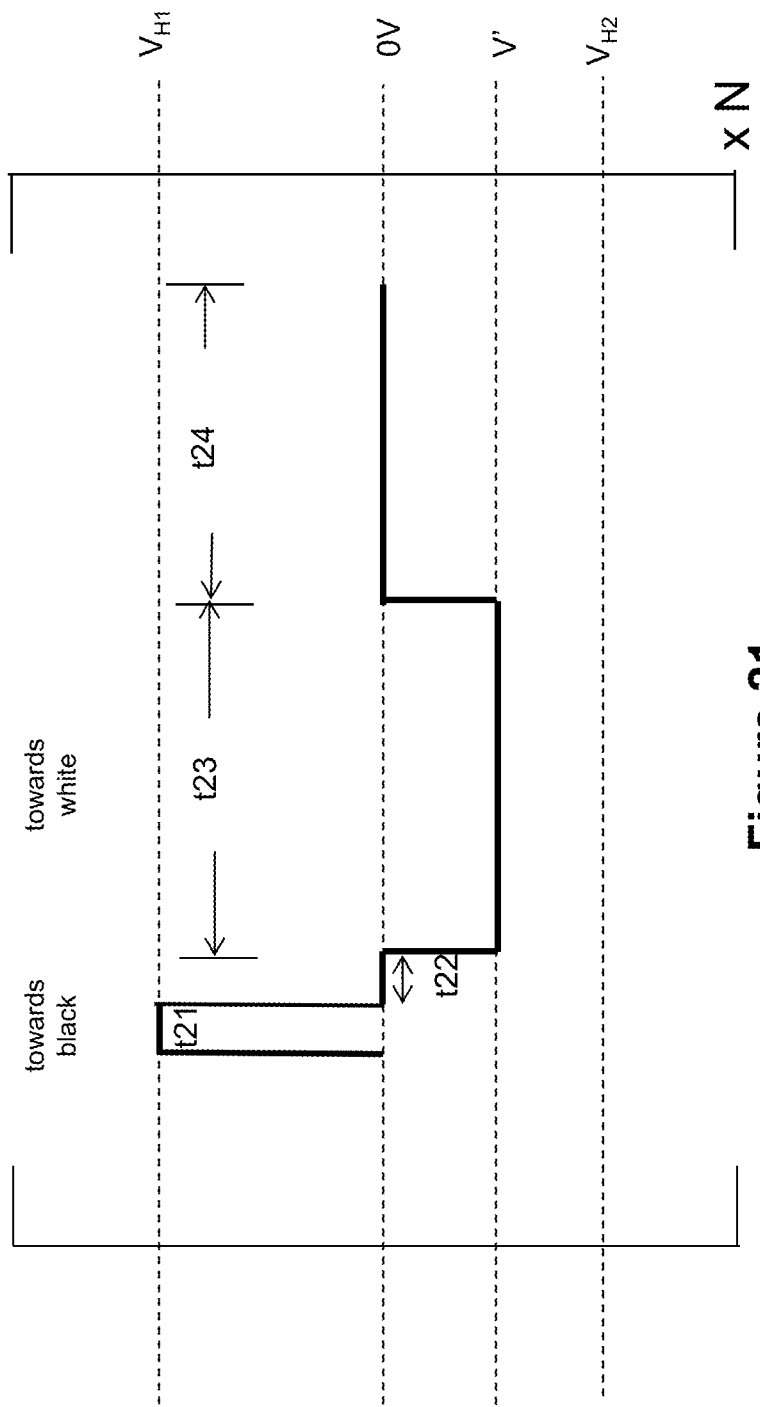
FIG. 21 illustrates a waveform derived from the waveform of FIG. 15 by incorporation of a second period of no electric field.

FIG. 21 illustrates a waveform which may be used in place of the waveform of FIG. 9 or 15 to replace the portion of the waveform of FIG. 5 occurring in period t6. The waveform of FIG. 21, which is essentially an inverted version of the waveform of FIG. 18, comprises driving towards black for an initial period of t21 (cf. period t9 in FIG. 9), followed by a wait time of t22 during which no driving voltage is applied. The wait time of t22 is followed by driving towards white for a period of t23 (cf. period t10 in FIG. 9), followed by a wait period of t24 in which no driving voltage is applied (cf. period t20 in FIG. 18). The waveform of FIG. 21 may be repeated at least 2 times, preferably at least 4 times and more preferably at least 8 times.

In the waveform of FIG. 21, the first wait time t22 is very short while the second wait time t24 is longer. The period t21 is also shorter than the period t23. For example, t21 may be in the range of 20-200 msec; t22 may be less than 100 msec; t23 may be in the range of 100-200 msec; and t24 may be less than 1000 msec.

Figure 22:
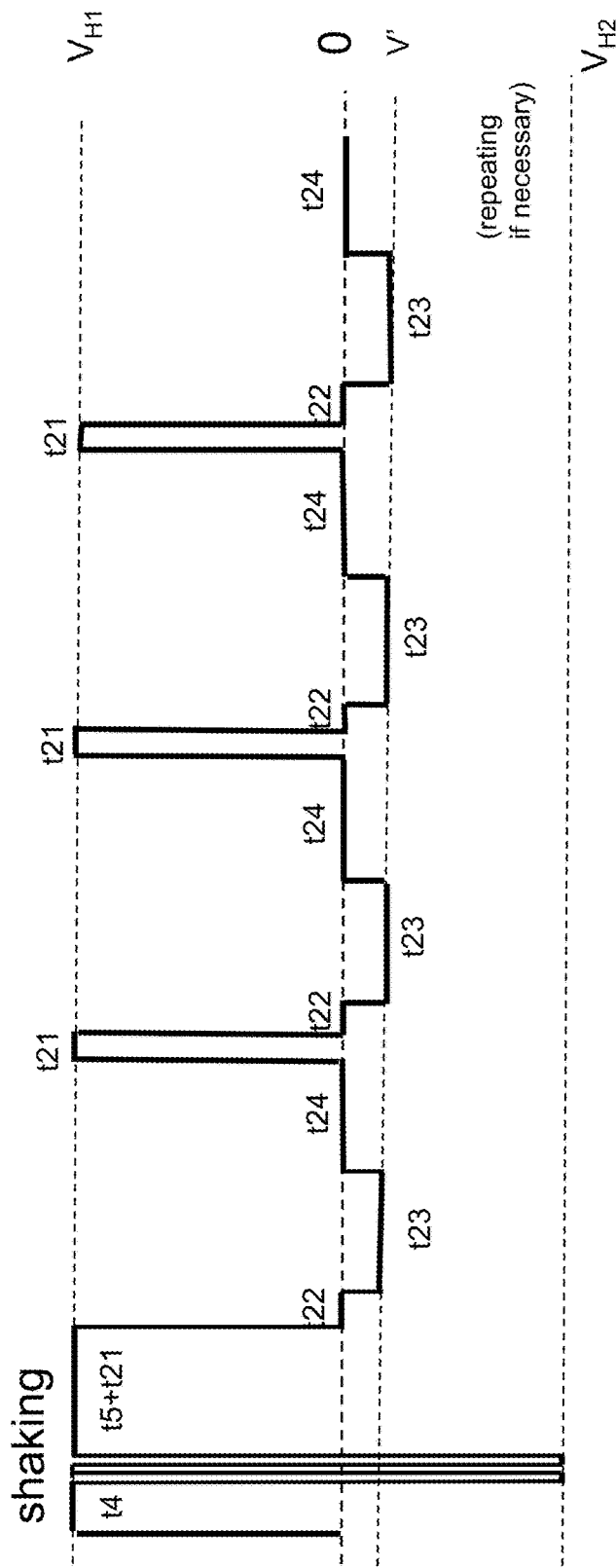
FIGS. 22 and 23 illustrates waveforms similar to those of FIGS. 16 and 17 respectively but using multiple repetitions of the waveform of FIG. 21 instead of the waveform of FIG. 15.

As already noted, the waveform of FIG. 21 may be used to replace the portion of the waveform of FIG. 5 occurring in period t6. FIG. 22 illustrates a waveform in which the portion of the waveform of FIG. 5 occurring in period t6 is replaced by four cycles of the waveform of FIG. 21 (more or fewer cycles may of course be used). In other words, the waveform of FIG. 22 comprises driving towards black for a period of t4 (cf. FIG. 5), a shaking waveform, driving towards black for a period of t5 (again, cf. FIG. 5), and then applying multiple cycles of the waveform of FIG. 21. As a general rule, the better the black state achieved at the end of period t5, the better the white state that will be displayed at the end of the waveform.

Figure 23:
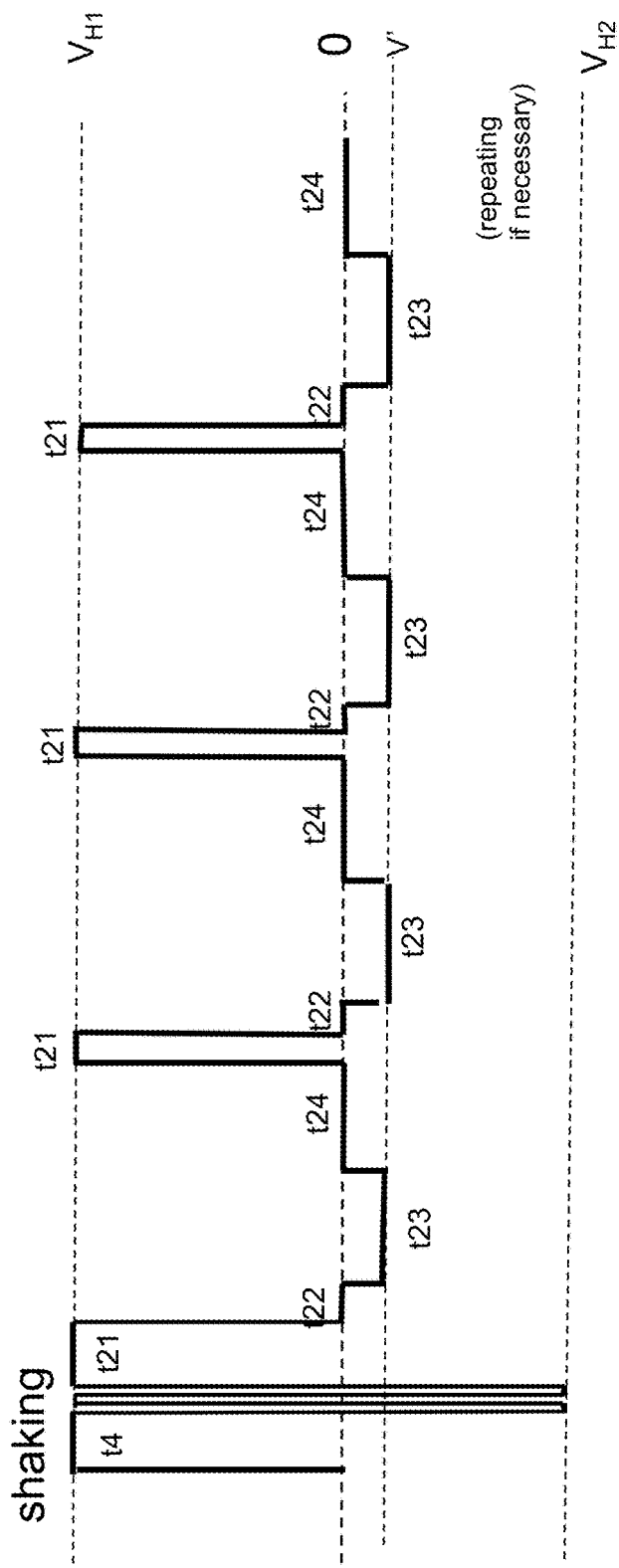

FIG. 23 illustrates a waveform similar to that of FIG. 22 but in which the step of driving towards the black state for the period of t5 is eliminated, so that the waveform of FIG. 23 transitions from the shaking waveform immediately to the waveform of FIG. 21. The waveforms of FIGS. 22 and 23 may each be DC balanced.

The driving methods of FIGS. 18-23 are not only particularly effective at a low temperature, but can also provide a display device better tolerance of structural variations caused during manufacture of the display device, and thus their usefulness is not limited to low temperature driving.

Figure 24:
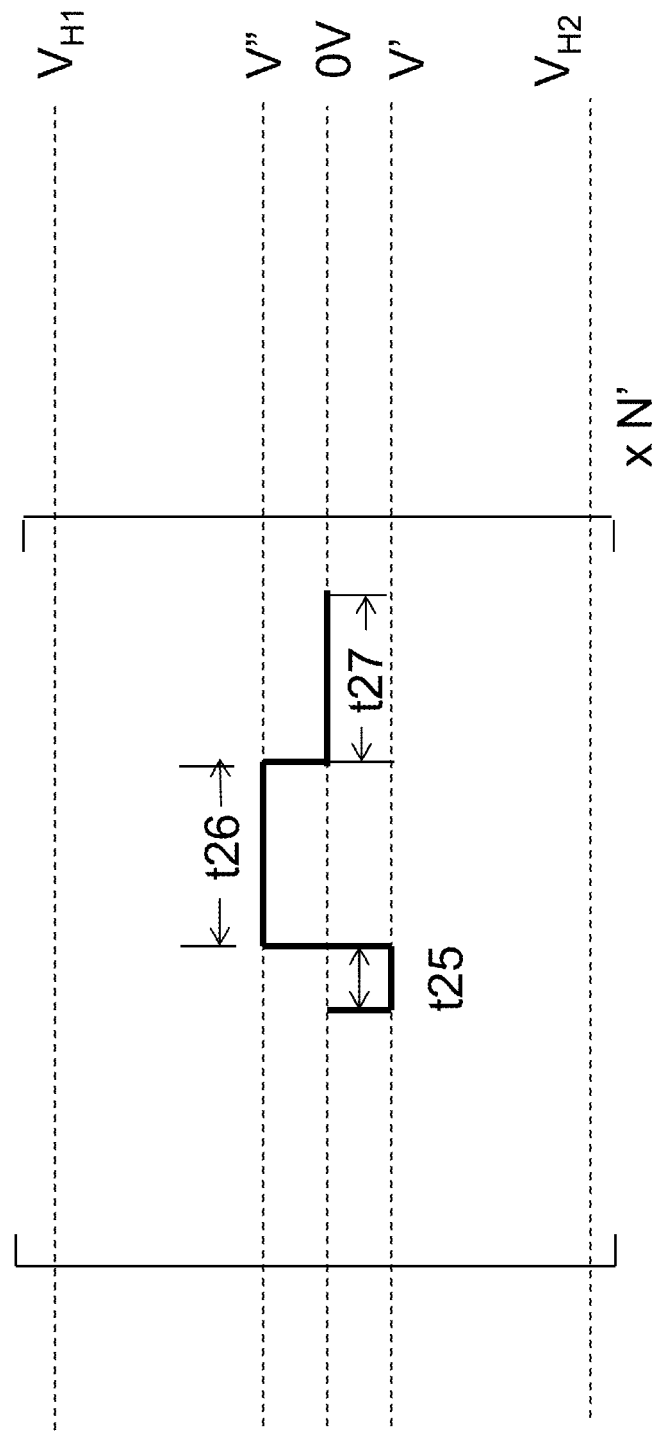
FIG. 24 illustrates a waveform which may be substituted for that illustrated in FIG. 9 to enable low temperature driving of the display layer.

FIGS. 24-29 illustrate waveforms which are particularly suitable for displaying the colors (red and white) of the low charged particles at low temperatures. FIG. 24 shows such a waveform for driving a pixel from the yellow state (high negative) to the red state (low positive).

As shown in FIG. 24, a low negative driving voltage (−V') is first applied for a period of t25, followed by a low positive driving voltage (+V") for a period t26 and a wait time t27. Since the waveform of FIG. 24 is repeated, the wait time t27 separates occurrences of the driving periods t25 and t26. The waveform of FIG. 24 may be repeated at least 2 times, preferably at least 4 times and more preferably at least 8 times.

The period t25 is shorter than the period t26. The wait time t27 may be in the range of 0 to 200 msec. The magnitudes of the driving voltages, V' and V" may be 50% of the amplitude of VH (e.g., VH1 or VH2). The magnitude of V' may be the same as, or different from, the magnitude of V".

Figure 25:
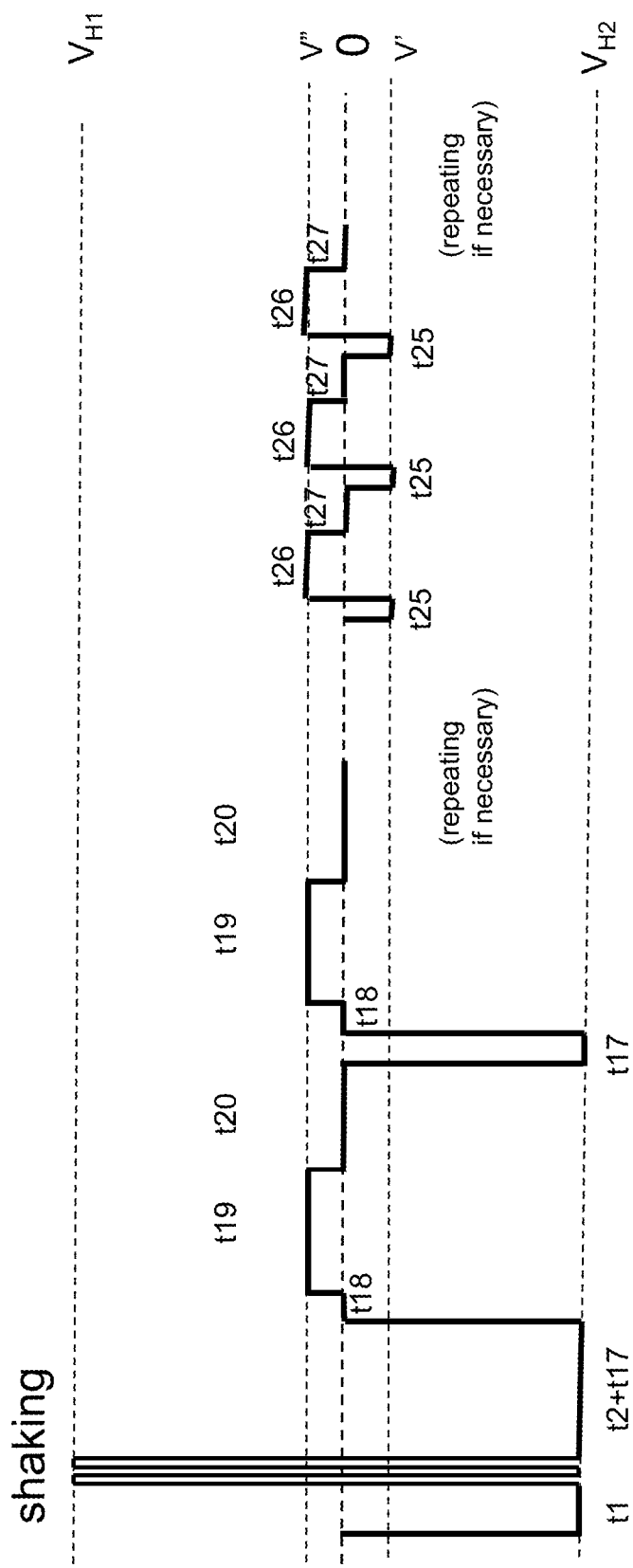
FIGS. 25 and 26 illustrate waveforms similar to those of FIGS. 19 and 20 respectively but using multiple repetitions of the waveform of FIG. 24 instead of the waveform of FIG. 18.
Figure 26:
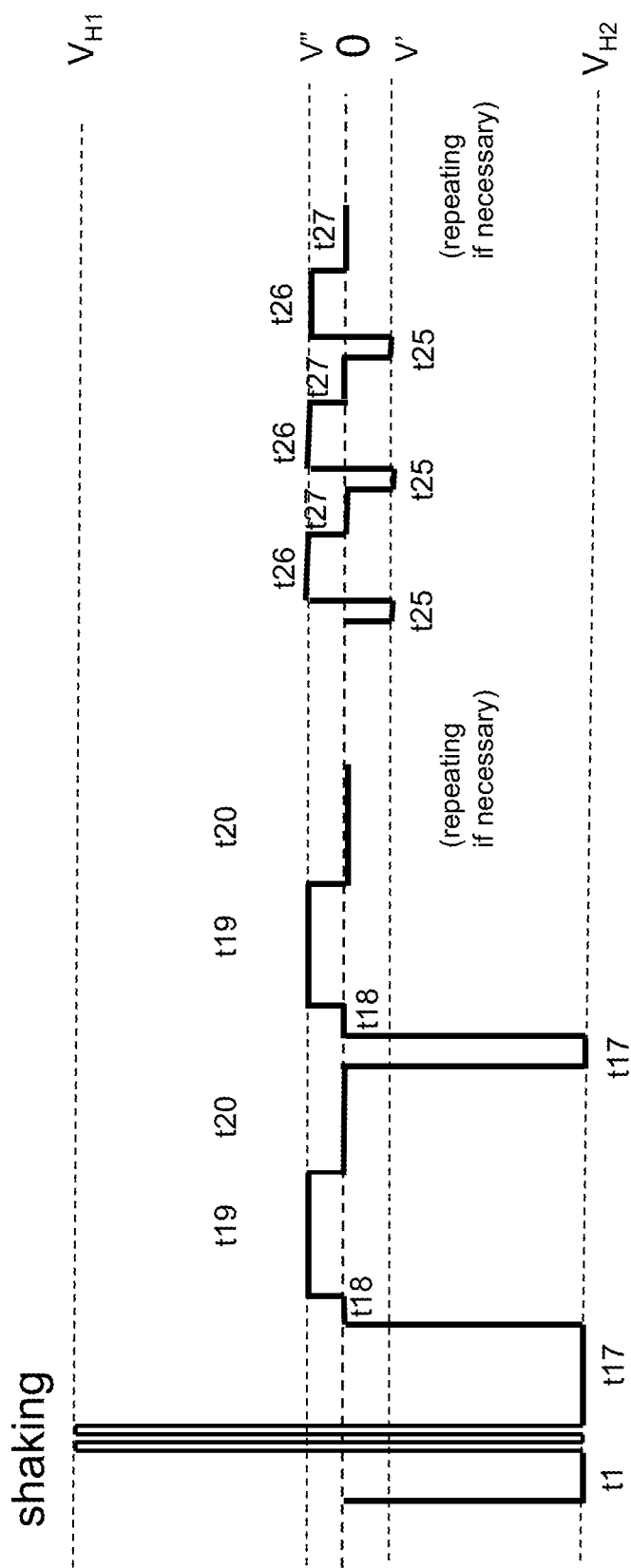

It has been found that the waveform of FIG. 24 is most effective when annexed to the end of the waveform of FIG. 19 or 20, and the resultant waveforms are shown in FIGS. 25 and 26, respectively. As will readily be apparent from comparison of FIGS. 25 and 19, the waveform of FIG. 25 essentially comprises the waveform of FIG. 19 but with only two repetitions of the waveform of FIG. 18 rather than four (although the number of repetitions of the waveform of FIG. 18 may be varied as desired), followed by three repetitions of the waveform of FIG. 24 (although the number of repetitions of the waveform of FIG. 24 may be varied as desired). Similarly, as will readily be apparent from comparison of FIGS. 26 and 20, the waveform of FIG. 26 essentially comprises the waveform of FIG. 20 but with only two repetitions of the waveform of FIG. 18 rather than four (although the number of repetitions of the waveform of FIG. 18 may be varied as desired), followed by three repetitions of the waveform of FIG. 24 (although the number of repetitions of the waveform of FIG. 24 may be varied as desired). The waveforms of FIGS. 25 and 26 may each be DC balanced.

Figure 27:
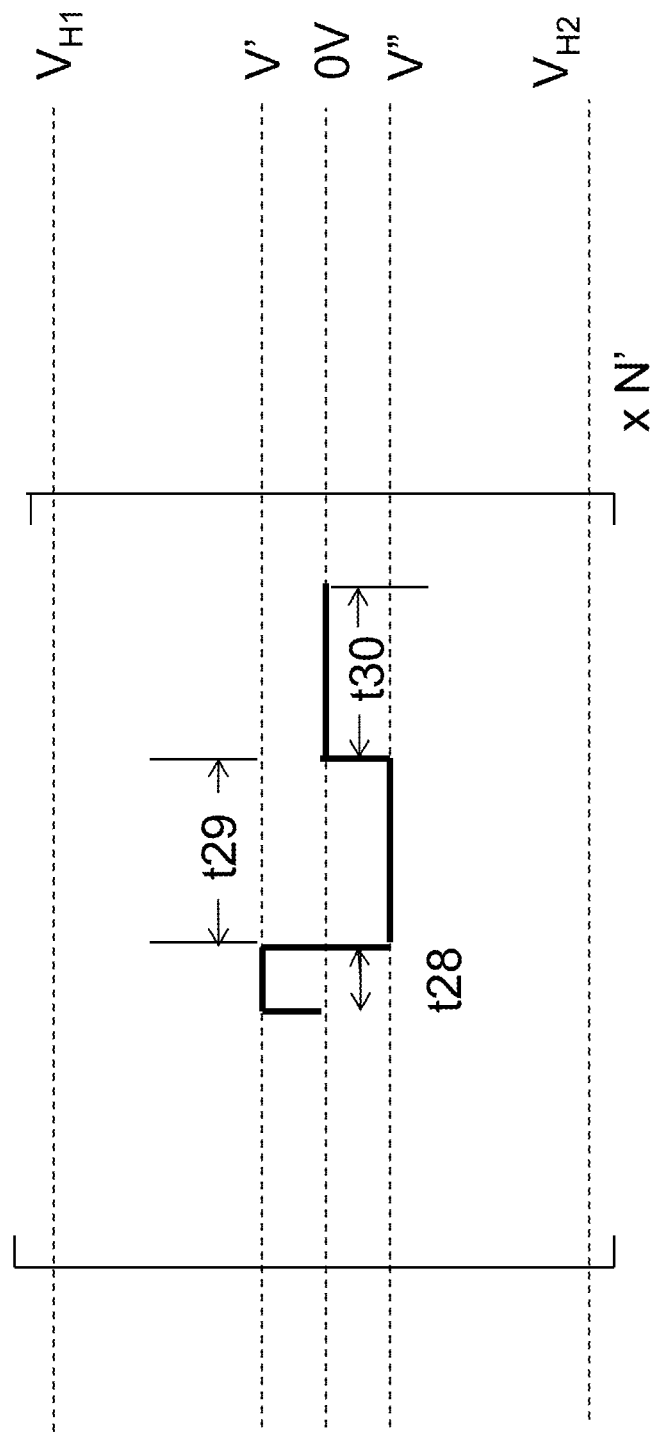
FIG. 27 illustrates a waveform which may be substituted for that illustrated in FIG. 5 to enable low temperature driving of the display layer.

FIG. 27 shows a waveform which is particularly suitable for low temperature driving of a pixel from the black state (high positive) to the white state (low negative). The waveform of FIG. 27, which is essentially an inverted version of the waveform of FIG. 24, comprises a low positive driving voltage (+V') applied for a period t28, followed by a low negative driving voltage (−V") for a period t29 and a wait time t30. Since the waveform of FIG. 27 is repeated, the wait time t30 separates occurrences of the driving periods t28 and t29. The waveform of FIG. 27 may be repeated at least 2 times, preferably at least 4 times and more preferably at least 8 times.

The period t28 is shorter than the period t29. The wait time t30 may be in the range of 0 to 200 msec. The magnitudes of the driving voltages, V' and V" may be 50% of the magnitude of VH (e.g., VH1 or VH2). The magnitude of V' may be the same as, or different from, the magnitude of V".

Figure 28:
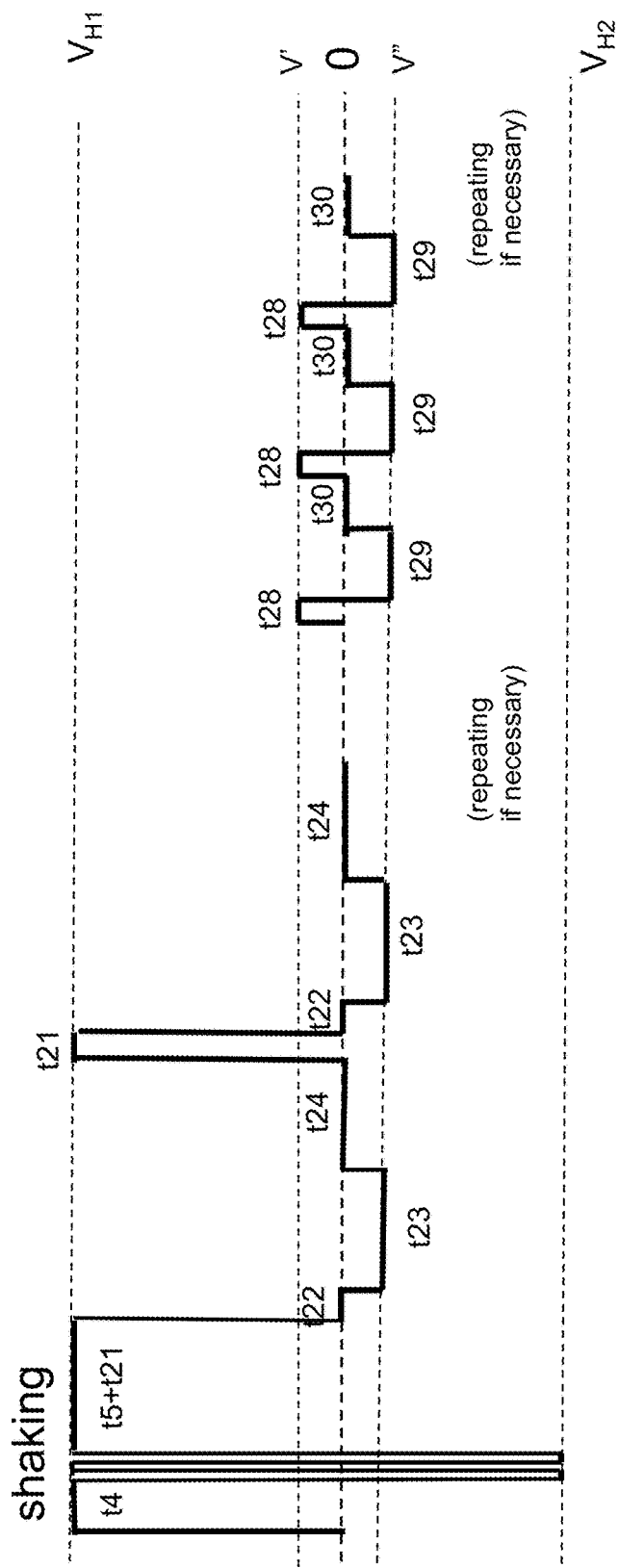
FIGS. 28 and 29 illustrate waveforms similar to those of FIGS. 22 and 23 respectively but using multiple repetitions of the waveform of FIG. 27 instead of the waveform of FIG. 21.
Figure 29:
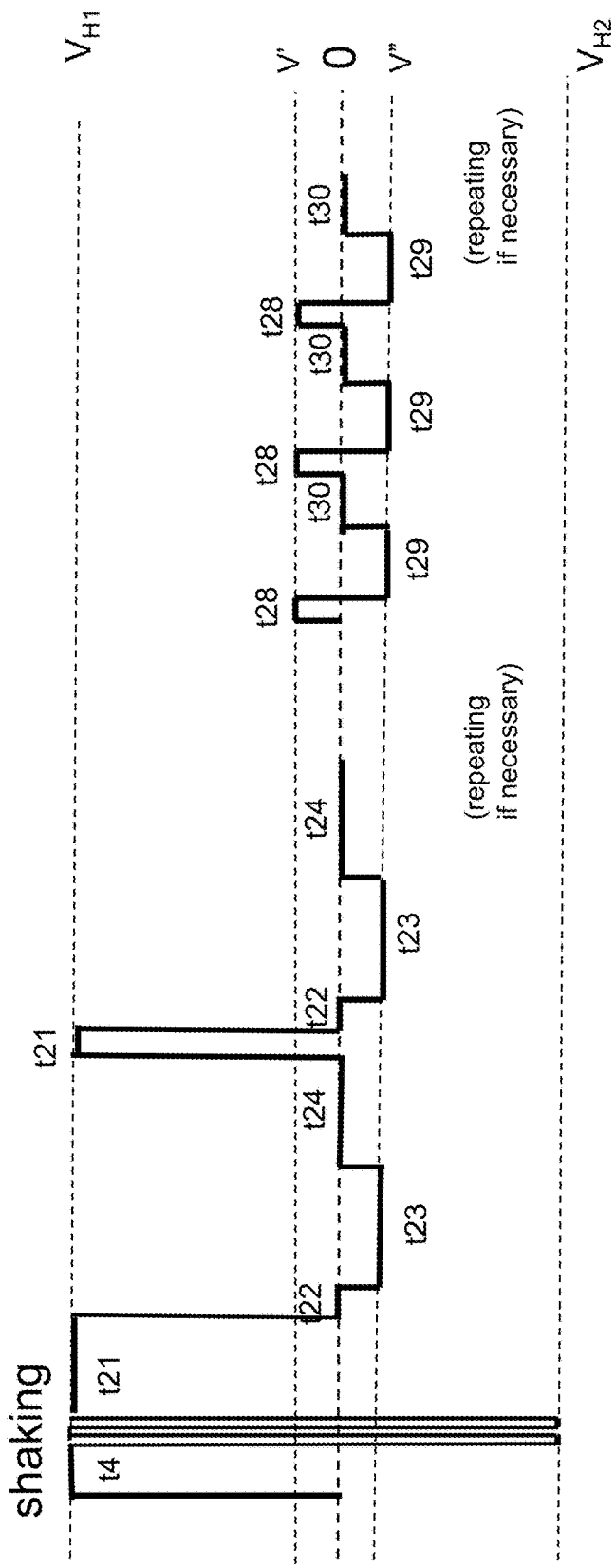

It has been found that the waveform of FIG. 27 is most effective when annexed to the end of the waveform of FIG. 22 or 23, and the resultant waveforms are shown in FIGS. 28 and 29, respectively. As will readily be apparent from comparison of FIGS. 28 and 22, the waveform of FIG. 28 essentially comprises the waveform of FIG. 22 but with only two repetitions of the waveform of FIG. 21 rather than four (although the number of repetitions of the waveform of FIG. 21 may be varied as desired), followed by three repetitions of the waveform of FIG. 27 (although the number of repetitions of the waveform of FIG. 27 may be varied as desired). Similarly, as will readily be apparent from comparison of FIGS. 29 and 23, the waveform of FIG. 29 essentially comprises the waveform of FIG. 23 but with only two repetitions of the waveform of FIG. 21 rather than four (although the number of repetitions of the waveform of FIG. 21 may be varied as desired), followed by three repetitions of the waveform of FIG. 27 (although the number of repetitions of the waveform of FIG. 27 may be varied as desired). The waveforms of FIGS. 28 and 29 may each be DC balanced.

The waveforms described thus far have been intended to display one of the four optical states shown in FIGS. 2-1 to 2-3, essentially the color of one of the four types of particles present in the display layer. It will be seen from the foregoing that while the embodiments of the invention previously described allow for the display of any one of four colors at each pixel, they do not provide an easy method for reproducibly controlling the gray level of each color or the degree of saturation thereof. Accordingly, if it is desired to use the present invention to provide gray scale color images, it will be necessary to dither (areally modulate) the pixels of the display to provide the necessary gray scale. For example, a desaturated red (pink) color could be displayed by setting alternating pixels of the display to red and white. Areal modulation in effect trades an increased number of gray levels for a reduction in display resolution (since the individual pixels are in effect used as sub-pixels of a larger pixel capable of gray level display), and the loss in resolution can be limited by increasing the number of reproducible color states (primaries) which can be displayed at each pixel. It has been found that the number of primaries available from each pixel in the methods of the present invention can be increased by driving each pixel to the color (orange in the embodiments shown in the drawings) presented by a mixture of the low positive (red) particles and the high negative (yellow) particles, and/or to the color (gray) presented by a mixture of the low negative (white) particles and the high positive (black) particles. The transitions and waveforms needed to provide these mixed colors will not be described with reference to FIGS. 30-35.

Figure 30:
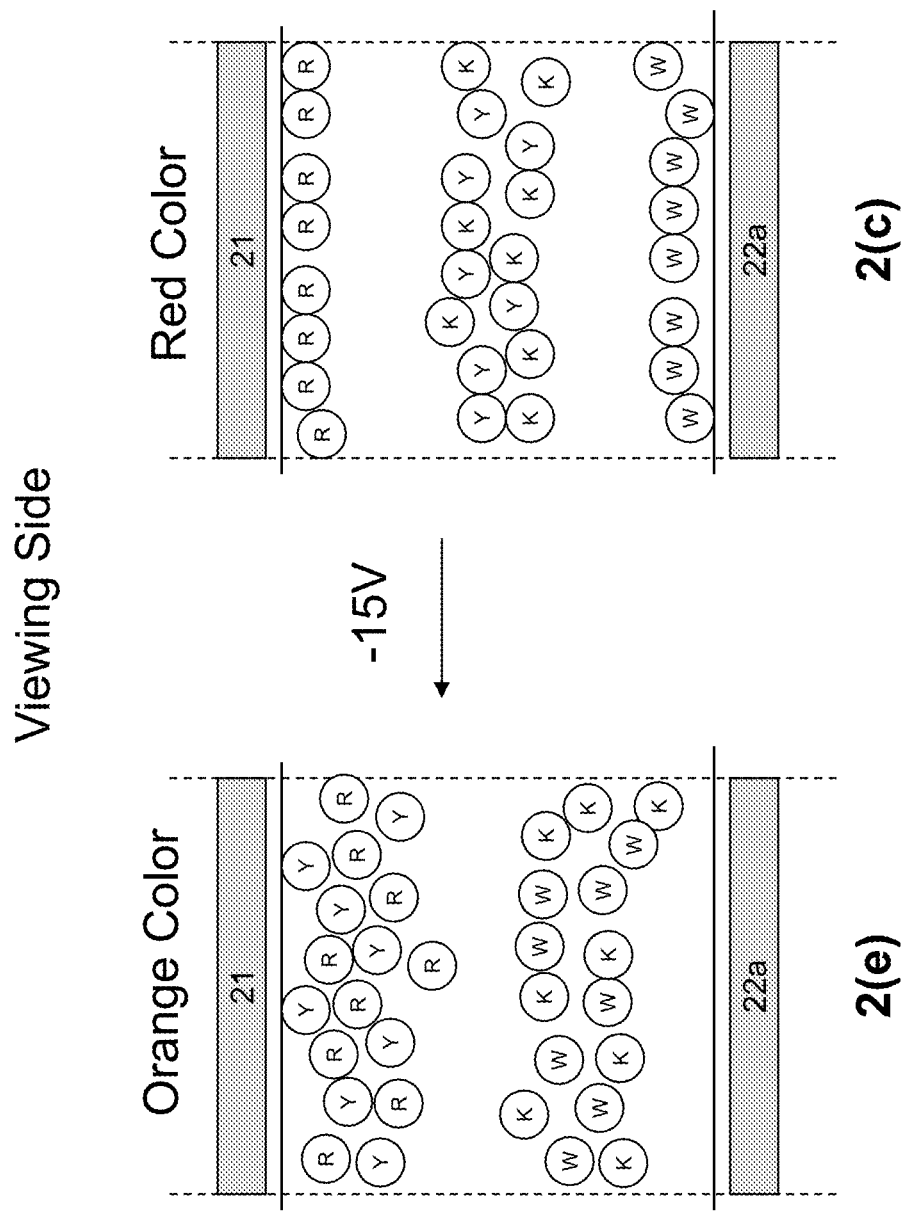
FIG. 30 is a schematic cross-section, similar to those of FIGS. 2-1 to 2-3, but showing the transition from the color of the low positive particles to a mixture of the colors of the low positive particles and the high negative particles.

It has been found that a reproducible mixed colors can only be obtained by first driving the display to the color of the low charged particle required in the mixed color and then applying a high driving voltage of a polarity which causes the appropriate high charged particle to mix with the low charged particle to form the desired mixed color. More specifically, as shown in FIG. 30, to provide a reproducible orange color it is necessary to start from the red state 2(c), previously shown on the right-hand side of FIG. 2-2 and reproduced on the right-hand side of FIG. 30. To transition from this red state 2(c) to the orange state 2(e) shown on the left-hand side of FIG. 30, a high negative driving voltage ($V_{H2}$, e.g. −15V) is applied to the pixel electrode (22a) (i.e., the common electrode is made strongly positive relative to the pixel electrode) for a brief period. The high driving voltage is sufficient to overcome the interactions between the black and yellow particles previously aggregated intermediate the pixel and front electrodes, so that the negatively charged yellow particles start moving rapidly towards the front electrode (21) while the positively charged black particles start moving towards the pixel electrode (22a). Simultaneously, the positively charged red particles begin moving away from the front electrode (21) towards the pixel electrode (22a), while the negatively charged white particles begin moving away from the pixel electrode (22a) towards the front electrode (21). However, because the electrophoretic mobilities of the low charged red and white particles are smaller than those of the high charged black and yellow particles, the red and white particles move more slowly than the black and yellow particles. The length of driving pulse is adjusted such that a mixture of red and yellow particles is present adjacent the front electrode (21) so that an orange color is seen at the viewing surface. A mixture of black and white particles is present adjacent the pixel electrode (22a) so that a gray color will be visible through the second surface of the display, if this surface is visible.

Note that it has been found empirically it is not possible to produce the mixed color starting from the color of the high charged particle required in the mixed color. Starting from the color of the high charged particles required in the mixed color and applying a low driving voltage of a polarity needed to bring the low charged particle adjacent the viewing surface does not result in a mixed color visible through the viewing surface. This is readily explicable by comparing FIGS. 2-2 and 30. The manner in which the orange state 2(e) is produced from the red state 2(c) has already been described with reference to FIG. 30. If, however, one tried to produce the orange state 2(e) by first producing the yellow state 2(a) shown on the left-hand side of FIG. 2-2 and then applying a low positive driving voltage $V_{L1}$, the greater electrophoretic mobility of the black and yellow particles, as compared with the red and white particles, would result in the formation of the black/yellow aggregate intermediate the front and pixel electrodes, as shown at 2(c) in FIG. 2-2 before any red particles could closely approach the front electrode, and thus at no time would a mixture of red and yellow particles be present adjacent the front electrode and no orange color would be seen through the viewing surface.

Figure 31:
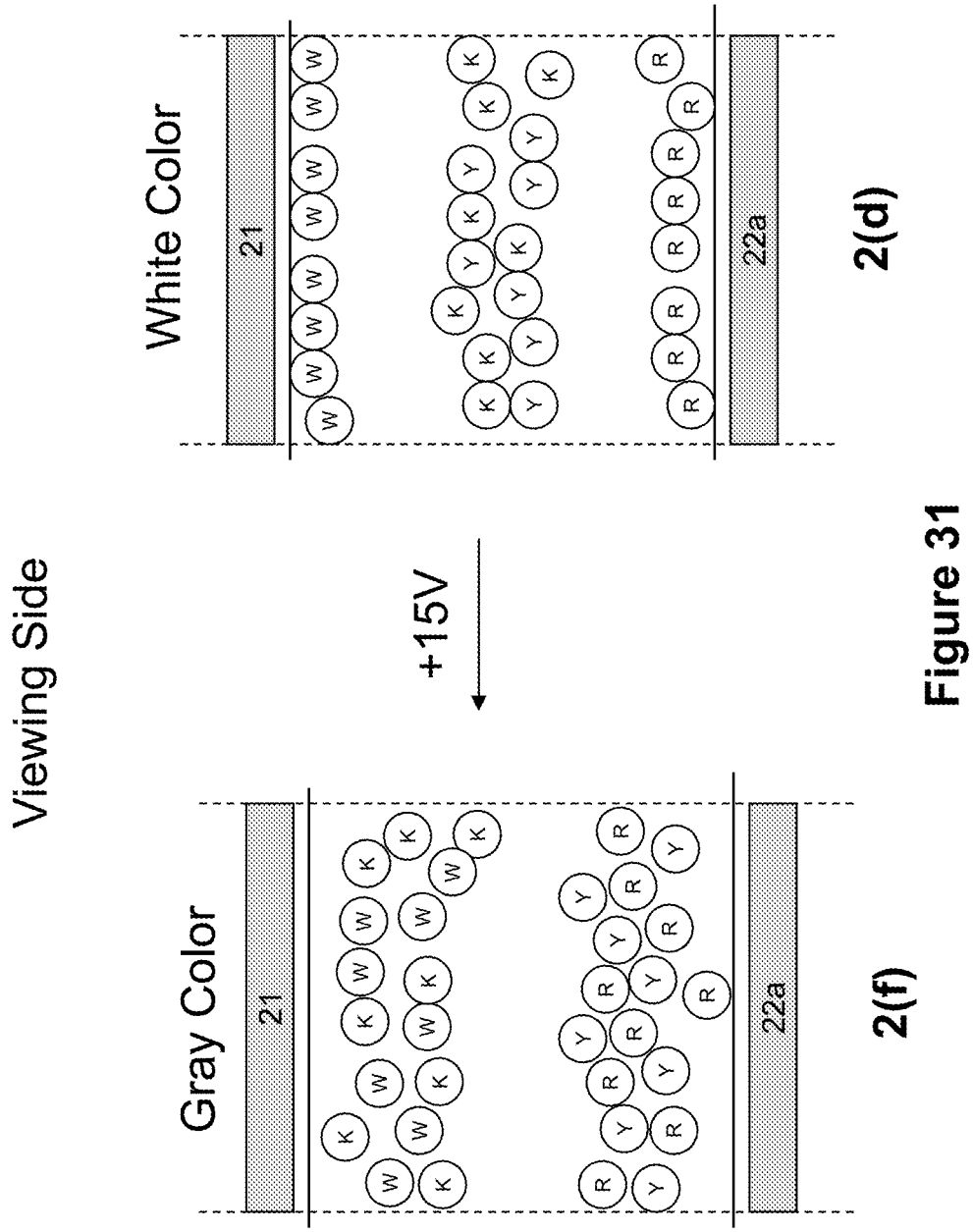
FIG. 31 is a schematic cross-section, similar to that of FIG. 30, but showing the transition from the color of the low negative particles to a mixture of the low negative particles and the high positive particles.

FIG. 31 illustrates the manner in which the gray state (designated 2(f)) of a pixel is obtained from the white state 2(d) thereof by brief application of a high positive driving voltage. Since the white state 2(d) is the exact inverse of the red state 2(c) shown in FIG. 30 (in the sense that the positions of the various particles are reversed relative to the two electrodes) and the movements of the particles in FIG. 31 are exactly similar to those in FIG. 30 except in the reverse directions, it is considered that a detailed description of these particle movements is unnecessary. The end result in FIG. 31 is the exact inverse of the end result in FIG. 30; in FIG. 31, a mixture of black and white particles is present adjacent the front electrode (21) so that that a gray color is seen at the viewing surface. A mixture of red and yellow particles is present adjacent the pixel electrode (22a) so that an orange color will be visible through the second surface of the display, if this surface is visible.

The red or white state 2(c) or 2(d) needed as a starting point for the transitions to mixed colors shown in FIGS. 30 and 31 can be produced in any of the ways previously described. In particular, the waveform used to produce the red or white state may be of a so-called "direct drive" type which contains only a single red- or white-going pulse, for example, the waveforms used in FIGS. 4 and 5, or may be of a so-called "push-pull" type in which a plurality of red- or white-going pulses alternate with pulse of the opposite polarity, for example the waveforms shown in FIGS. 7, 8, 10 and 11.

Figure 32:
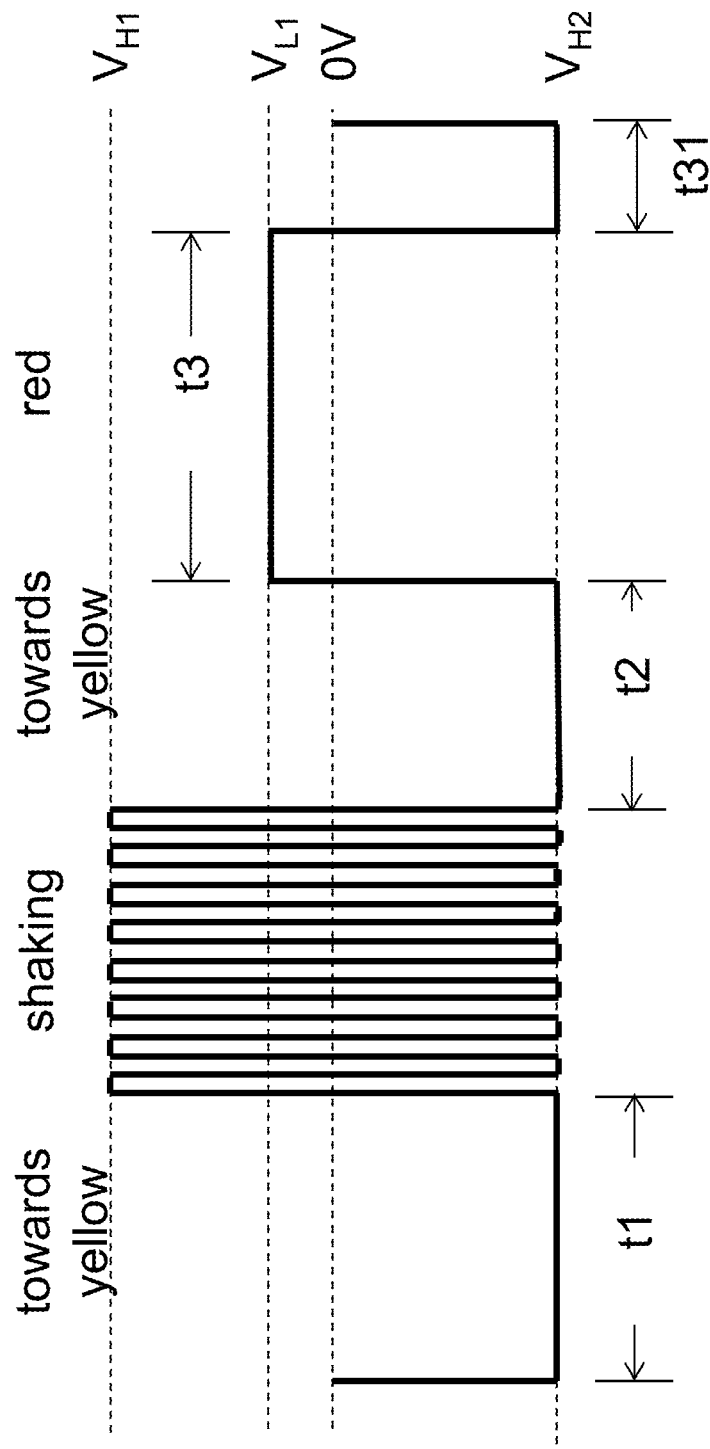
FIG. 32 illustrates a modification of the waveform of FIG. 4 to enable the display layer to carry out the transition of FIG. 30.

FIG. 32 illustrates a direct drive waveform which may be used to produce the orange state 2(e) shown in FIG. 30. The waveform of FIG. 32 is identical to that of FIG. 4 except that the waveform of FIG. 32 terminates in a high negative ($V_{H2}$) driving pulse for a period t31. There period t31 will typically be shorter than period t2 or t3, and indeed t31 will normally be no longer than 50% of t2.

Figure 33:
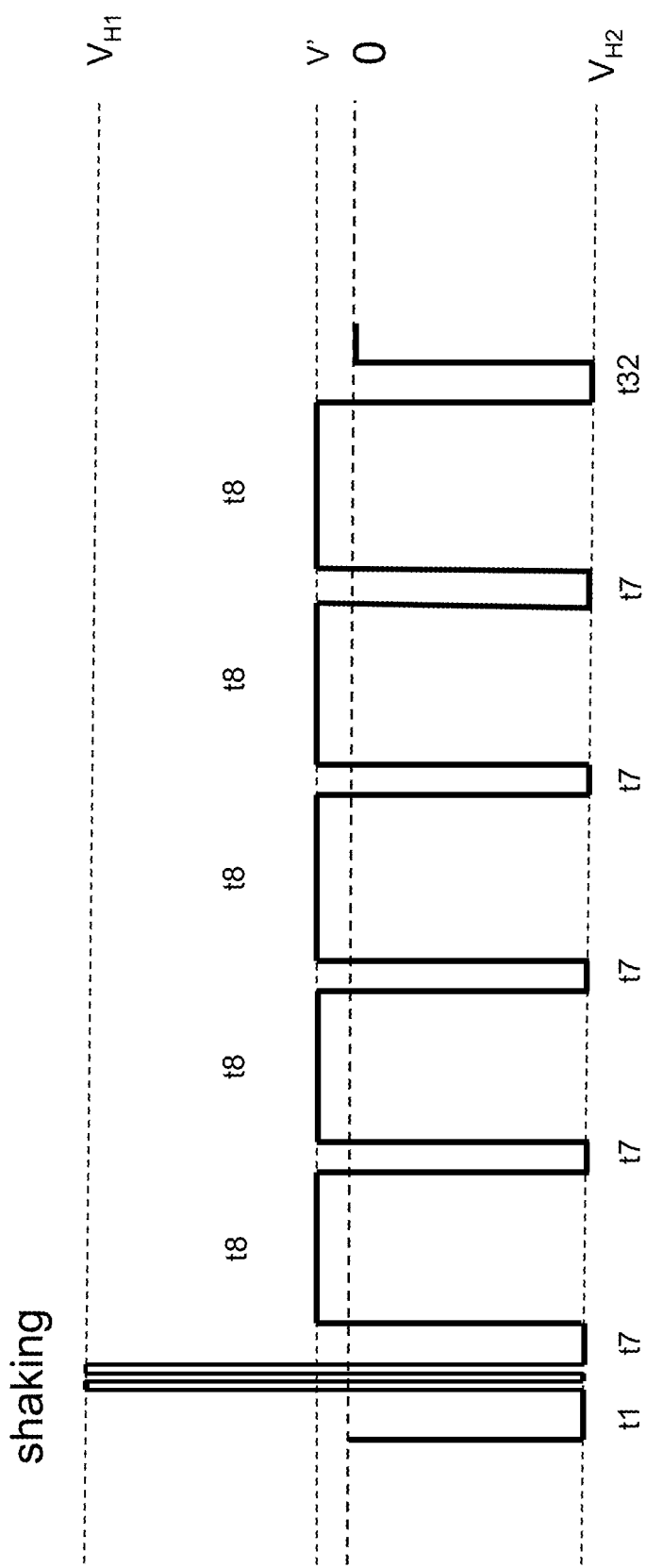
FIG. 33 illustrates a modification of the waveform of FIG. 8 to enable the display layer to carry out the transition of FIG. 30.

FIG. 33 illustrates a push-pull waveform which may be used to produce the orange state 2(e) shown in FIG. 30. The waveform of FIG. 33 is identical to that of FIG. 8 except that the waveform of FIG. 32 terminates in a high negative ($V_{H2}$) driving pulse for a period t32. The period t32 will typically be shorter than period t8, and indeed t32 will normally be no longer than 50% of t8.

Figure 34:
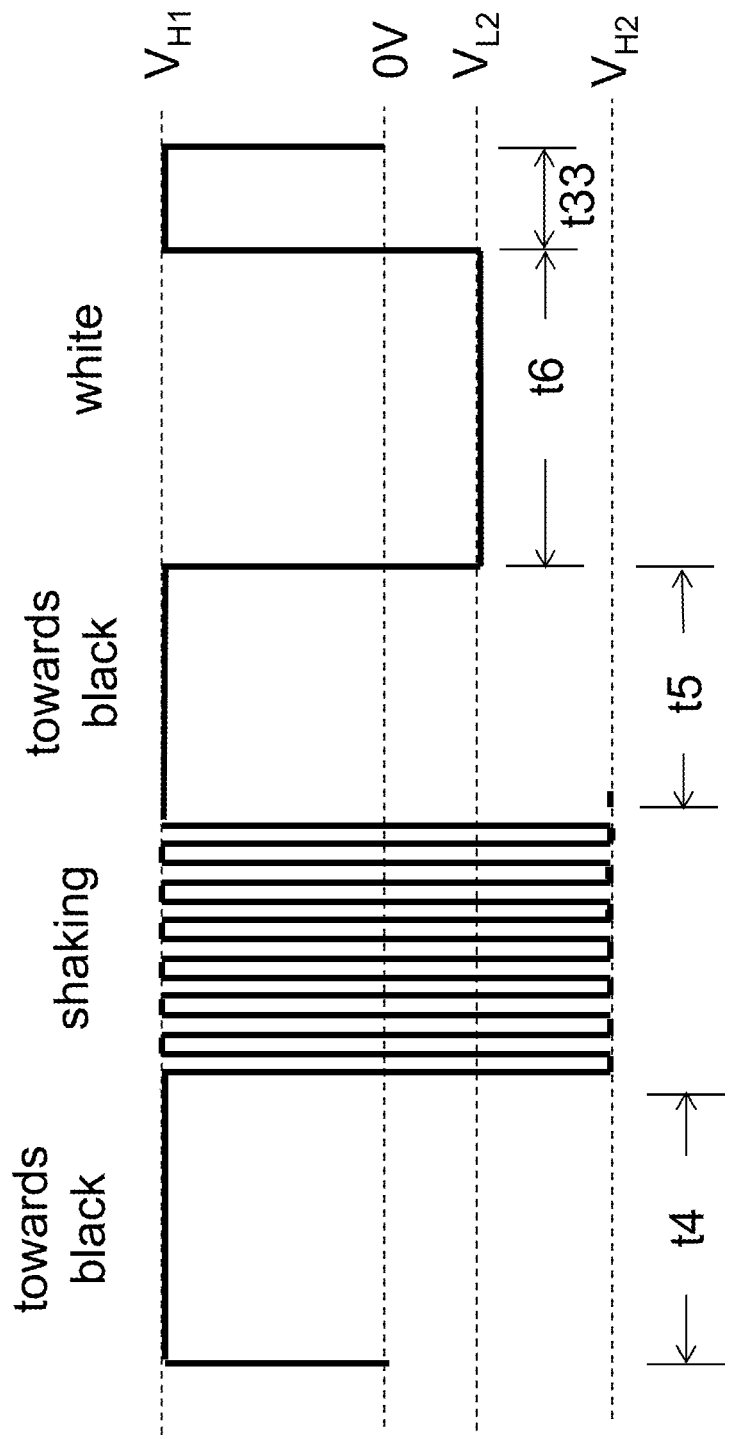
FIG. 34 illustrates a modification of the waveform of FIG. 5 to enable the display layer to carry out the transition of FIG. 31.

FIG. 34 illustrates a direct drive waveform which may be used to produce the gray state 2(f) shown in FIG. 31. The waveform of FIG. 34 is identical to that of FIG. 5 except that the waveform of FIG. 34 terminates in a high positive ($V_{H1}$) driving pulse for a period t33. There period t33 will typically be shorter than period t5 or t6, and indeed t33 will normally be no longer than 50% of t5.

Figure 35:
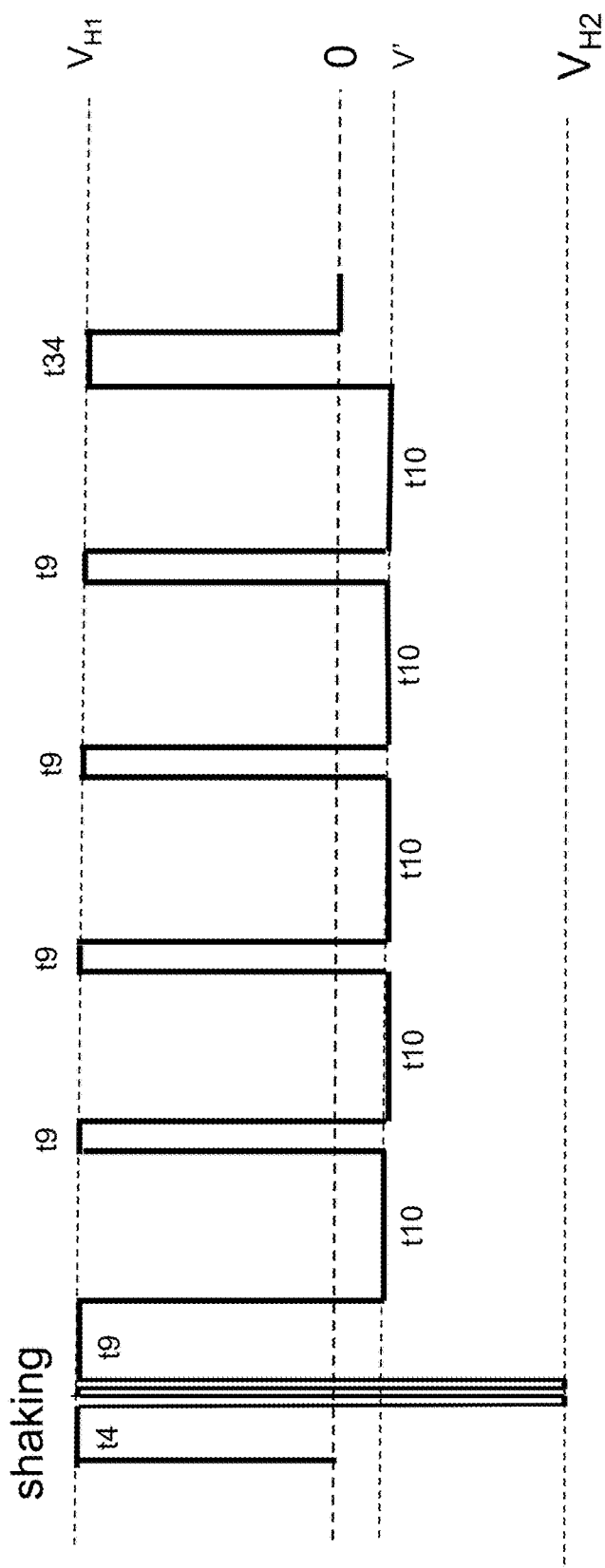
FIG. 35 illustrates a modification of the waveform of FIG. 11 to enable the display layer to carry out the transition of FIG. 31.

FIG. 35 illustrates a push-pull waveform which may be used to produce the gray state 2(f) shown in FIG. 31. The waveform of FIG. 35 is identical to that of FIG. 11 except that the waveform of FIG. 35 terminates in a high positive ($V_{H2}$) driving pulse for a period t34. The period t32 will typically be shorter than period t10, and indeed t34 will normally be no longer than 50% of t10.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

The invention claimed is:

1. A method of driving a display layer having a first, viewing surface and a second surface on the opposed side of the display layer from the first surface, the display layer being provided with means for applying an electric field between the first and second surfaces, the display layer further comprising an electrophoretic medium comprising a fluid and first, second, third and fourth types of particles dispersed in the fluid, the first, second, third and fourth types of particles having respectively first, second, third and fourth optical characteristics differing from one another, the first and third types of particles having charges of one polarity and the second and fourth types of particles having charges of the opposite polarity, the method comprising, in any order:
 (i) applying a first electric field having a high magnitude and a polarity driving the first type of particles towards the viewing surface, thereby causing the display layer to display the first optical characteristic at the viewing surface;
 (ii) applying a second electric field having a high magnitude and a polarity driving the second type of particles towards the viewing surface, thereby causing the display layer to display the second optical characteristic at the viewing surface;
 (iii) when the second optical characteristic is displayed at the viewing surface, applying a third electric field having a low magnitude and a polarity driving the third type of particles towards the viewing surface, thereby causing the display layer to display the third optical characteristic at the viewing surface; and
 (iv) when the first optical characteristic is displayed at the viewing surface, applying a fourth electric field having a low magnitude and a polarity driving the fourth type of particles towards the viewing surface, thereby causing the display layer to display the fourth optical characteristic at viewing surface.

2. The method of claim 1 wherein the third electric field is applied for a longer time than the first electric field and/or the fourth electric field is applied for a longer time than the second electric field.

3. The method of claim 1 wherein each of steps (i)-(iv) are repeated.

4. The method of claim 3 wherein each of steps (i)-(iv) are repeated at least four times.

5. The method of claim 4 wherein each of steps (i)-(iv) are repeated at least eight times.

6. The method of claim 1 wherein the magnitudes of the third and fourth electric fields are less than 50 percent of the magnitudes of the first and second electric fields respectively.

7. The method of claim 1 further comprising applying a shaking waveform before at least one of steps (i)-(iv).

8. The method of claim 7 further comprising driving the pixel to display the first or second optical characteristic after the shaking waveform but prior to step (i) or (ii).

9. The method of claim 1 further comprising applying no electric field for a period of time following at least one of steps (i)-(iv) and thereafter repeating steps (i)-(iv).

10. The method of claim 1 wherein at least one of steps (iii) and (iv) further comprises applying no electric field for a period of time before applying the third or fourth electric field respectively.

11. The method of claim 1 wherein step (iii) is effected by first applying a high electric field having a polarity which drives the third particles towards the second surface and thereafter applying said third electric field.

12. The method of claim 11 further comprising applying a shaking waveform prior to application of the high electric field.

13. The method of claim 12 further comprising applying said high electric field for a second period prior to the shaking waveform.

14. The method of claim 11 wherein the application of the high electric field and the application of the third electric field are repeated at least twice.

15. The method of claim 14 wherein the application of the high electric field and the application of the third electric field are repeated at least four times.

16. The method of claim 14 further comprising applying no electric field for a period following the application of the third electric field.

17. A method according to claim 11 further comprising applying no electric field for a period between the application of the high electric field and the application of the third electric field.

18. The method of claim 1 wherein step (iv) is effected by first applying a high electric field having a polarity which drives the fourth particles towards the second surface and thereafter applying said fourth electric field.

19. The method of claim 18 further comprising applying a shaking waveform prior to application of the high electric field.

20. The method of claim 18 further comprising applying said high electric field for a second period prior to the shaking waveform.

21. The method of claim 18 wherein the application of the high electric field and the application of the third electric field are repeated at least twice.

22. The method of claim 21 wherein the application of the high electric field and the application of the third electric field are repeated at least four times.

23. The method of claim 21 further comprising applying no electric field for a period following the application of the third electric field.

24. The method of claim 18 further comprising applying no electric field for a period between the application of the high electric field and the application of the third electric field.

25. The method of claim 1 further comprising:
 (v) when the third optical characteristic is displayed at the viewing surface, applying a fifth electric field having a high magnitude and a polarity driving the third type of particles towards the second surface, thereby causing the display layer to display a mixture of the second and third optical characteristics at the viewing surface.

26. The method of claim 25 wherein the fifth electric field is applied for a period shorter than the third electric field.

27. The method of claim 26 wherein the fifth electric field is applied for a period no longer than 50 percent of the period for which the third electric field is applied.

28. The method of claim 25 wherein the third optical characteristic is displayed at the viewing surface by applying said third electrical field to the electrophoretic layer, and the application of the third electric field followed by the fifth electric field is repeated at least twice.

29. The method of claim 25 wherein the third optical characteristic is displayed at the viewing surface by first applying a high electric field having a polarity which drives the third particles towards the second surface and thereafter applying said third electric field.

30. The method of claim 1 further comprising:
(vi) when the fourth optical characteristic is displayed at the viewing surface, applying a sixth electric field having a high magnitude and a polarity driving the fourth type of particles towards the second surface, thereby causing the display layer to display a mixture of the first and fourth optical characteristics at the viewing surface.

31. The method of claim 30 wherein the sixth electric field is applied for a period shorter than the fourth electric field.

32. The method of claim 31 wherein the sixth electric field is applied for a period no longer than 50 percent of the period for which the fourth electric field is applied.

33. The method of claim 30 wherein the fourth optical characteristic is displayed at the viewing surface by applying said fourth electrical field to the electrophoretic layer, and the application of the fourth electric field followed by the sixth electric field is repeated at least twice.

34. The method of claim 30 wherein the fourth optical characteristic is displayed at the viewing surface by first applying a high electric field having a polarity which drives the fourth particles towards the second surface and thereafter applying said fourth electric field.

* * * * *